(12) United States Patent
Midorikawa

(10) Patent No.: US 11,269,285 B2
(45) Date of Patent: Mar. 8, 2022

(54) WIRING HOLDER AND IMAGE FORMING APPARATUS INCLUDING WIRING HOLDER

(71) Applicant: Ruki Midorikawa, Kanagawa (JP)

(72) Inventor: Ruki Midorikawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/173,704

(22) Filed: Feb. 11, 2021

(65) Prior Publication Data

US 2021/0255577 A1 Aug. 19, 2021

(30) Foreign Application Priority Data

Feb. 14, 2020 (JP) .............................. JP2020-023764

(51) Int. Cl.
*G03G 15/00* (2006.01)
*G03G 21/16* (2006.01)
*F16L 3/12* (2006.01)

(52) U.S. Cl.
CPC ............ *G03G 21/1633* (2013.01); *F16L 3/12* (2013.01); *G03G 15/80* (2013.01)

(58) Field of Classification Search
CPC ........ G03G 15/80; G03G 21/1633; F16L 3/12
See application file for complete search history.

(56) References Cited

U.S. PATENT DOCUMENTS

| 9,110,428 | B2* | 8/2015 | Imoto ................... G03G 15/80 |
| 2017/0235264 | A1 | 8/2017 | Midorikawa et al. |
| 2018/0024480 | A1* | 1/2018 | Fujita ................. G03G 15/2039 |
| | | | 399/33 |
| 2019/0248609 | A1 | 8/2019 | Midorikawa |
| 2020/0363765 | A1* | 11/2020 | Murata ................. G03G 15/80 |
| 2020/0387102 | A1 | 12/2020 | Midorikawa |
| 2020/0409301 | A1* | 12/2020 | Kuroki ................. G03G 15/80 |

FOREIGN PATENT DOCUMENTS

| JP | 6-202486 | 7/1994 |
| JP | 2015-104301 | 6/2015 |
| JP | 2018-168894 | 11/2018 |

* cited by examiner

*Primary Examiner* — Sophia S Chen

(74) *Attorney, Agent, or Firm* — Harness, Dickey & Pierce, P.L.C.

(57) ABSTRACT

A wiring holder includes a first member and a second member attached to the first member. The first member and the second member are configured to hold an electric wire. At least one of the first member and the second member includes a connector cover portion configured to cover a connector at one end of the electric wire.

13 Claims, 15 Drawing Sheets

WIRING HOLDER AND IMAGE FORMING APPARATUS INCLUDING WIRING HOLDER

CROSS-REFERENCE TO RELATED APPLICATION

This patent application is based on and claims priority pursuant to 35 U.S.C. § 119(a) to Japanese Patent Application No. 2020-023764, filed on Feb. 14, 2020, in the Japan Patent Office, the entire disclosure of which is hereby incorporated by reference herein.

BACKGROUND

Technical Field

Embodiments of the present disclosure relate to a wiring holder and an image forming apparatus including the wiring holder.

Related Art

There is known a wiring holder that includes a first member and a second member attached to the first member and holds electric wires with the first member and the second member.

For example, a wiring holder includes a fixed member as a first member fixed to a member and a holding member as a second member detachably attached to the fixed member. The fixed member and the holding member hold a tube through which an electric wire or the like is inserted.

SUMMARY

According to an aspect of the present disclosure, there is provided a wiring holder includes a first member and a second member attached to the first member. The first member and the second member hold an electric wire. At least one of the first member and the second member includes a connector cover portion to cover a connector at one end of the electric wire.

According to another aspect of the present disclosure, there is provided an image forming apparatus that includes an electric component, an electric wire, a connector, and the wiring holder. The connector is disposed at one end of the electric wire and connected to the electric component. The wiring holder holds the electric wire.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
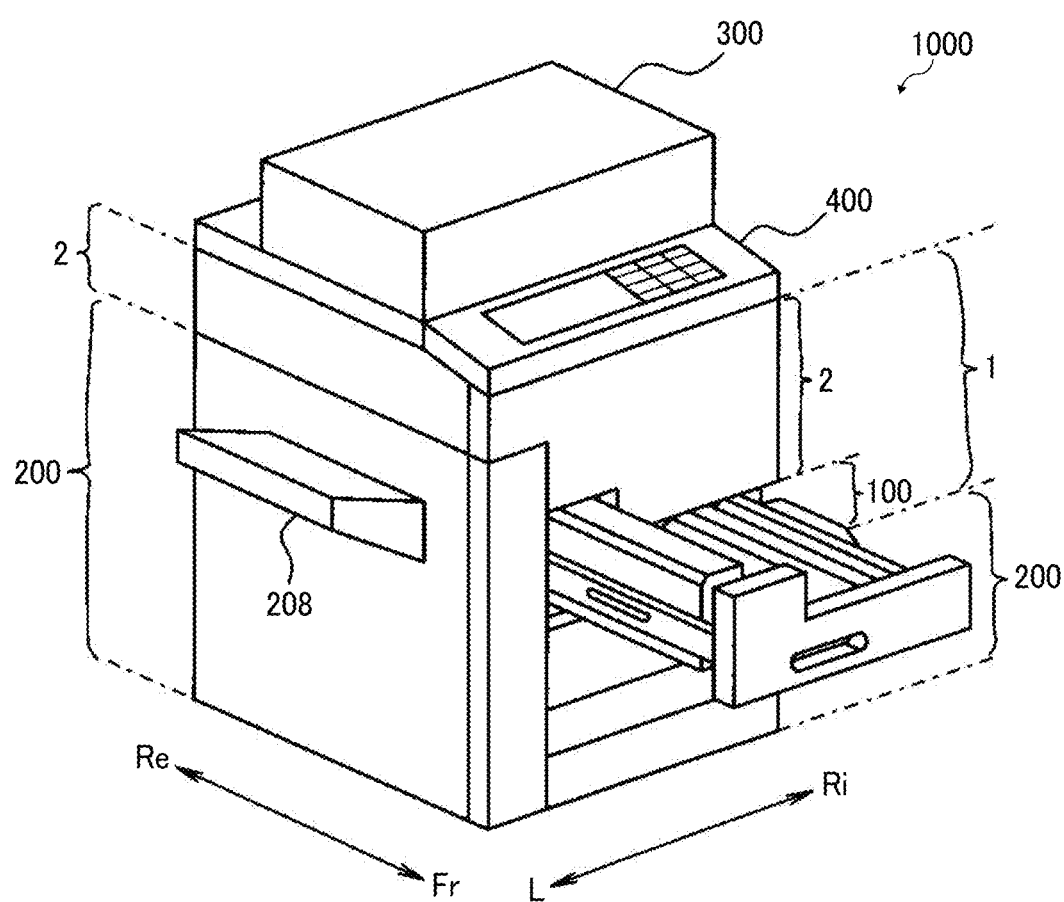
FIG. 1 is an external perspective view of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Hereinafter, descriptions are given of an image forming apparatus, for example a copier in the following embodiments, according to an embodiment of the present disclosure. First, a description is given of an image forming apparatus according to the embodiment. FIG. 1 is an external perspective view illustrating an image forming apparatus 1000 according to an embodiment of the present disclosure. The image forming apparatus 1000 includes a printing device 1, a sheet feeding and ejecting device 200, a scanner 300, and a control panel 400. The printing device 1 forms and prints an image by an electrophotographic method. An automatic document feeder is mounted on the scanner 300.

The printing device 1 that forms an image on a sheet includes an image forming device 2 and a sheet conveying device 100. As illustrated in FIG. 1, the sheet conveying device 100 is slidably movable relative to a housing of the printing device 1 that includes the image forming device 2, so that the sheet conveying device 100 is removable from the housing of the printing device 1.

In FIG. 1, the image forming apparatus 1000 is illustrated from a diagonally left front side. A direction indicated by arrow Fr in FIG. 1 indicates a direction toward a front side of the image forming apparatus 1000 in the interior of the image forming apparatus 1000. A direction indicated by arrow Re indicates a direction toward a rear side of the image forming apparatus 1000 in the interior of the image forming apparatus 1000. A direction indicated by arrow Ri indicates a direction toward a right side of the image forming apparatus 1000 in the interior of the image forming apparatus 1000. A direction indicated by arrow L indicates a direction toward a left side of the image forming apparatus 1000 in the interior of the image forming apparatus 1000.

Figure 2:
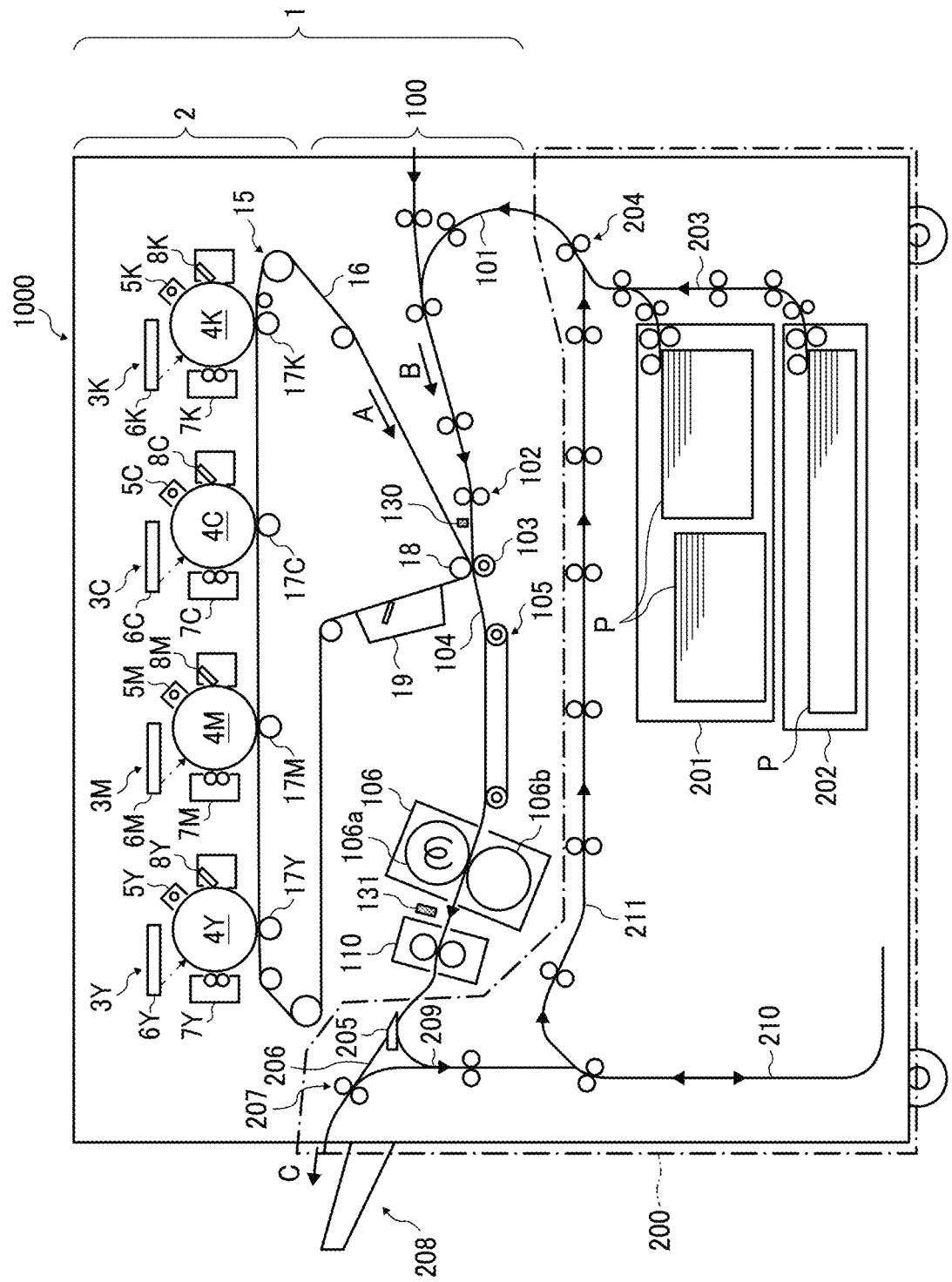
FIG. 2 is a diagram illustrating an outline of internal structures of a printing device and a sheet feeding and ejecting device of the image forming apparatus of FIG. 1, viewed from a front side of the image forming apparatus.

FIG. 2 is a diagram illustrating an outline of internal structures of the printing device 1 and the sheet feeding and ejecting device 200 of the image forming apparatus 1000 of FIG. 1, viewed from the front side of the image forming apparatus 1000. The image forming device 2 of the printing device 1 includes image forming units 3Y, 3M, 3C, and 3K to form toner images of yellow (Y), magenta (M), cyan (C), and black (K), respectively. The image forming units 3Y, 3M, 3C, and 3K are arranged at a given pitch in a left-right direction of the image forming apparatus 1000. Note that suffixes Y, M, C, and K after respective numerals indicate members or devices for forming yellow, magenta, cyan, and black toner images, respectively.

The image forming device 2 further includes a sheet transfer unit 15 disposed below the image forming units 3Y, 3M, 3C, and 3K for forming yellow, magenta, cyan, and black toner images, respectively.

The image forming units 3Y, 3M, 3C, and 3K for forming yellow, magenta, cyan, and black toner images have substantially identical configurations to each other, except that the colors of toners to be used for forming respective color toner images are different from each other. Hereinafter, the configuration of each image forming unit (i.e., the image forming units 3Y, 3M, 3C, and 3K) is described without the suffixes and the image forming unit is referred to in a singular form, for example, as the "image forming unit 3." In addition, the following devices and units provided in each image forming unit 3 are also referred to in a singular form occasionally.

The image forming unit 3 (i.e., the image forming units 3Y, 3M, 3C, and 3K) includes a drum-shaped photoconductor 4 (i.e., photoconductors 4Y, 4M, 4C, and 4K). Furthermore, the image forming unit 3 includes an electric charger 5 (i.e., electric chargers 5Y, 5M, 5C, and 5K), an exposure device 6 (i.e., exposure devices 6Y, 6M, 6C, and 6K), a developing device 7 (i.e., developing devices 7Y, 7M, 7C, and 7K), and a drum cleaning device 8 (i.e., drum cleaning devices 8Y, 8M, 8C, and 8K). The electric charger 5, the exposure device 6, the developing device 7, and the drum cleaning device 8 are disposed around the photoconductor 4.

In the image forming unit 3, the photoconductor 4 is rotationally driven in a counterclockwise direction in FIG. 2, and a circumferential surface of the photoconductor 4 is uniformly charged by the electric charger 5 at a position facing the electric charger 5. According to this configuration, the circumferential surface of the photoconductor 4 is charged to the same polarity as a charging polarity of the toner. After the surface of the photoconductor 4 is uniformly charged, the surface of the photoconductor 4 is optically scanned by the exposure device 6 that emits laser light modulated based on image data. The irradiated area of the surface of the photoconductor 4 exposed by the optical scanning has potential attenuated to carry (bear) an electrostatic latent image.

A corresponding toner of the yellow, magenta, cyan, and black toners is made to selectively adhere by the developing device 7 to develop the electrostatic latent image into a visible toner image. With rotation of the photoconductor 4, the toner image enters a primary transfer nip region at which the toner image is transferred. The primary transfer nip region is formed by contact between the photoconductor 4 and an intermediate transfer belt 16. The details of the intermediate transfer belt 16 is described below.

The sheet transfer unit 15 causes the intermediate transfer belt 16 to move endlessly in a direction indicated by arrow A in FIG. 2 by rotating one of a plurality of rollers while the intermediate transfer belt 16 is wound and stretched around the plurality of rollers disposed inside a loop of the intermediate transfer belt 16.

Among the plurality of rollers disposed inside the loop of the intermediate transfer belt 16, a primary transfer roller 17 (i.e., primary transfer rollers 17Y, 17M, 17C, and 17K) for transferring the toner image interposes the intermediate transfer belt 16 in a space with the photoconductor 4 that carries (bears) the toner image. With this configuration, the primary transfer nip region is formed by the contact between the photoconductor 4 and an outer circumferential surface of the intermediate transfer belt 16.

The primary transfer roller 17 is applied with primary transfer bias having a polarity opposite to the charging polarity of the toner. With this configuration, a primary transfer electric field is formed at the primary transfer nip region, and the primary transfer electric field electrostatically moves (transfers) the toner image formed on the photoconductor 4, from the surface of the photoconductor 4 onto the surface of the intermediate transfer belt 16. The toner image on the photoconductor 4 is primarily transferred onto the outer circumferential surface of the intermediate transfer belt 16 by an action of the primary transfer electric field and an action of a nip pressure at the primary transfer nip region.

After the photoconductor 4 has passed through the primary transfer nip region, transfer residual toner that has not been primarily transferred onto the intermediate transfer belt 16 remains on the surface of the photoconductor 4. The transfer residual toner is removed from the surface of the photoconductor 4 by the drum cleaning device 8.

The above-described electrophotographic processes are performed with each of the image forming units 3Y, 3M, 3C, and 3K for forming respective yellow, magenta, cyan, and black toner images on the surfaces of the photoconductors 4Y, 4M, 4C, and 4K.

To be more specific, the primary transfer rollers 17Y, 17M, 17C, and 17K are aligned inside the loop of the intermediate transfer belt 16 and interpose the intermediate transfer belt 16 in each space with the photoconductors 4Y, 4M, 4C, and 4K, respectively. With this configuration, the primary transfer nip regions for transferring the yellow, magenta, cyan, and black toner images are formed by contact between the outer circumferential surface of the intermediate transfer belt 16 and the photoconductors 4Y, 4M, 4C, and 4K.

According to the order of alignment of the photoconductors 4Y, 4M, 4C, and 4K, the yellow toner is first transferred onto the outer circumferential surface of the intermediate transfer belt 16 in the process of primary transfer. Then, the magenta, cyan, and black toner images are transferred at the respective primary transfer nip regions in a manner sequentially superimposed on the yellow toner image that has been primarily transferred onto the outer circumferential surface of the intermediate transfer belt 16. With this structure, a four-color composite toner image is formed on the outer circumferential surface of the intermediate transfer belt 16.

A secondary transfer roller 103 is disposed below the intermediate transfer belt 16. The secondary transfer roller 103 interposes the intermediate transfer belt 16 in a space with a secondary transfer opposing roller 18 disposed inside the loop of the intermediate transfer belt 16. With this configuration, a secondary transfer nip region is formed by contact of the outer circumferential surface of the intermediate transfer belt 16 and the secondary transfer roller 103. In the secondary transfer nip region, a secondary electric field is formed between the secondary transfer opposing roller 18 and the secondary transfer roller 103. The secondary transfer opposing roller 18 is applied with secondary transfer bias having the same polarity as the charging polarity of the toner. The secondary transfer roller 103 is electrically grounded.

The four-color composite toner image on the outer circumferential surface of the intermediate transfer belt 16 enters the secondary transfer nip region along with the endless movement of the intermediate transfer belt 16.

The sheet feeding and ejecting device 200 of the image forming apparatus 1000 includes a large-capacity sheet bank 201 and a sheet feed tray 202 below the sheet conveying device 100 of the printing device 1. A sheet P fed out from the sheet bank 201 or the sheet feed tray 202 into a sheet feed passage 203 is conveyed upward by a plurality of pairs of sheet conveying rollers disposed along the sheet feed passage 203 in a direction indicated by arrow B in FIG. 2. Then, the sheet P is delivered into a sheet conveyance passage 101 of the sheet conveying device 100 of the printing device 1 by a pair of sheet transfer rollers 204 provided near a terminal of the sheet feed passage 203.

The sheet P that has been transferred from the sheet feed passage 203 to the sheet conveyance passage 101 is conveyed by a plurality of pairs of sheet conveying rollers disposed along the sheet conveyance passage 101. When the sheet P contacts a registration nip region between a pair of sheet registration rollers 102 disposed near a terminal of the sheet conveyance passage 101, skew of the sheet P is corrected. Thereafter, the sheet P is conveyed to the secondary transfer nip region as the pair of sheet registration rollers 102 rotates at a timing in synchronization with movement of the four-color composite toner image on the intermediate transfer belt 16.

The four-color composite toner image is secondarily transferred by an action of the secondary transfer electric field and an action of the nip pressure onto the sheet P that is brought to closely contact with the four-color composite toner image on the intermediate transfer belt 16 at the secondary transfer nip region. Consequently, a full-color image is formed on the sheet P of white color.

After the intermediate transfer belt 16 has passed through the secondary transfer nip region, transfer residual toner that has not been secondarily transferred onto the sheet P remains on the outer circumferential surface of the intermediate transfer belt 16. The transfer residual toner is removed from the intermediate transfer belt 16 by a belt cleaning device 19.

The sheet conveying device 100 of the printing device 1 further includes a post-transfer conveyance passage 104, a sheet conveyance belt unit 105, a fixing device 106, and a conveyance cooling unit 110, in addition to the sheet conveyance passage 101, the pair of sheet registration rollers 102, and the secondary transfer roller 103.

The sheet P that has passed through the secondary transfer nip region is conveyed to the post-transfer conveyance passage 104. The post-transfer conveyance passage 104 runs through the sheet conveyance belt unit 105, the fixing device 106, and the conveyance cooling unit 110.

The sheet P conveyed to the post-transfer conveyance passage 104 is first conveyed from the right side to the left side of the image forming apparatus 1000 by the sheet conveyance belt unit 105, and then conveyed into the fixing device 106.

The fixing device 106 forms a fixing nip region by contact between a fixing roller 106a and a pressure roller 106b pressed against the fixing roller 106a. The fixing roller 106a includes a heat source such as a halogen lamp. The sheet P conveyed into the fixing device 106 enters the fixing nip region in which heat and pressure are applied to the sheet P. Consequently, a full-color image is fixed to the surface of the sheet P.

The sheet P that has passed through the fixing device 106 passes through the conveyance cooling unit 110, and then is conveyed to a left end of the sheet feeding and ejecting device 200.

The left end of the sheet feeding and ejecting device 200 is provided with a switching claw 205, a sheet ejection passage 206, a pair of sheet ejection rollers 207, a sheet reverse passage 209, and a switchback passage 210. Additionally, a sheet reentry passage 211 is disposed above the sheet bank 201 in the sheet feeding and ejecting device 200.

The switching claw 205 that functions as a switching member moves to switch and select a subsequent conveyance destination of the sheet P that has been delivered to the left end of the sheet feeding and ejecting device 200 from the conveyance cooling unit 110 of the sheet conveying device 100 of the printing device 1. The sheet ejection passage 206 that functions as a second branch conveyance passage is selected as the conveyance destination of the sheet P at completion of single-sided printing in a single-side printing mode to form an image on one side of the sheet P or completion of double-sided printing in a duplex printing mode to form an image on both faces of the sheet P. The sheet P that has been conveyed to the sheet ejection passage 206 passes through the pair of sheet ejection rollers 207, and then is ejected to the outside of the image forming apparatus 1000 in a direction indicated by arrow C in FIG. 2, to be stacked on a sheet stacker 208.

On the other hand, when the single-sided printing in the duplex printing mode is finished, in other words, an image is formed on one side or a first side of the sheet P, the sheet reverse passage 209 that functions as a first branch conveyance passage is selected as the conveyance destination of the sheet P. The sheet P that has been conveyed to the sheet reverse passage 209 enters the switchback passage 210, and then is turned upside down by a switchback operation to be conveyed to the sheet reentry passage 211. Then, the sheet P passes through the sheet reentry passage 211, and then is conveyed again to the sheet conveyance passage 101. Thereafter, a full-color image is secondarily transferred onto the other side or a second side of the sheet P at the secondary transfer nip region. Then, the sheet P sequentially passes through the fixing device 106, the conveyance cooling unit 110, the sheet ejection passage 206, and the pair of sheet ejection rollers 207, and is eventually ejected to the outside of the image forming apparatus 1000.

When the sheet P is ejected onto the sheet stacker 208 with face down, the sheet reverse passage 209 is selected as the conveyance destination of the sheet P. The sheet P that has been conveyed to the sheet reverse passage 209 enters the switchback passage 210, and then is turned upside down by a switchback operation to be ejected to the outside of the image forming apparatus 1000.

The image forming apparatus 1000 further includes a registration roller exit sensor 130 and a fixing device exit sensor 131. The registration roller exit sensor 130 detects the sheet P after the sheet P has passed through the pair of sheet registration rollers 102. The fixing device exit sensor 131 detects the sheet P after the sheet P has passed through the fixing device 106.

The sheet P that has passed through the fixing device 106 is high in temperature. In recent years, a printing speed is remarkably accelerated, and in a case in which the sheet P is conveyed while having high temperature, the face of a sheet P with an image is likely to be streaked or scratched due to a load of a guide member or a blocking phenomenon in which sheets P stick to each other is likely to occur.

The conveyance cooling unit 110 cools a sheet P while conveying the sheet P conveyed from the fixing device 106.

Figure 3:
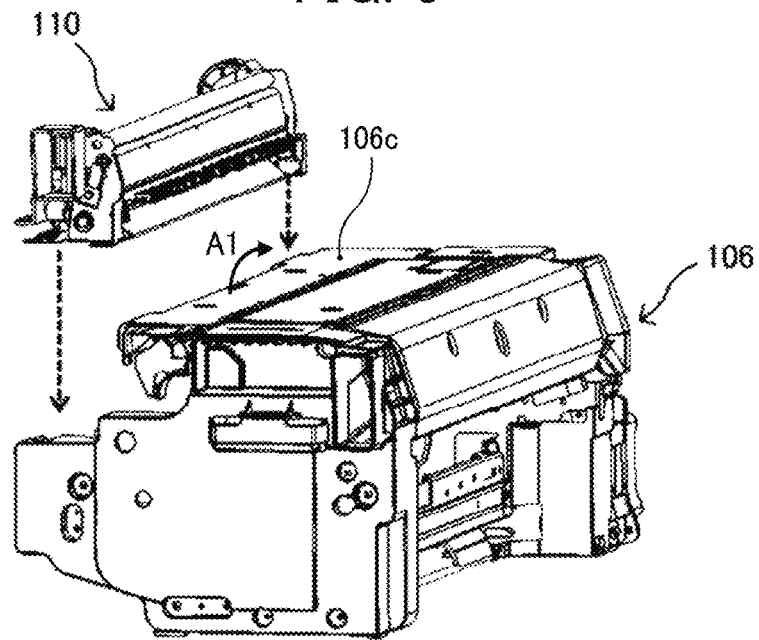
FIG. 3 is a perspective view illustrating a fixing device and a conveyance cooling unit according to an embodiment of the present disclosure.

FIG. 3 is a perspective view illustrating the fixing device 106 and the conveyance cooling unit 110. As indicated by broken arrows in FIG. 3, the conveyance cooling unit 110 is installed in the fixing device 106 so that a sheet P is cooled while the conveyance cooling unit 110 is conveying the sheet P immediately after the sheet P is ejected from the fixing device 106. An upper fixing cover 106c on the downstream side of the fixing device 106 in the conveyance direction is rotatable. Rotating the upper fixing cover 106c in a direction indicated by arrow A1 in FIG. 3 exposes the conveyance path on the downstream side of the fixing device 106 in the conveyance direction, thus allowing removal of a jammed sheet in the fixing device 106.

Figure 4:
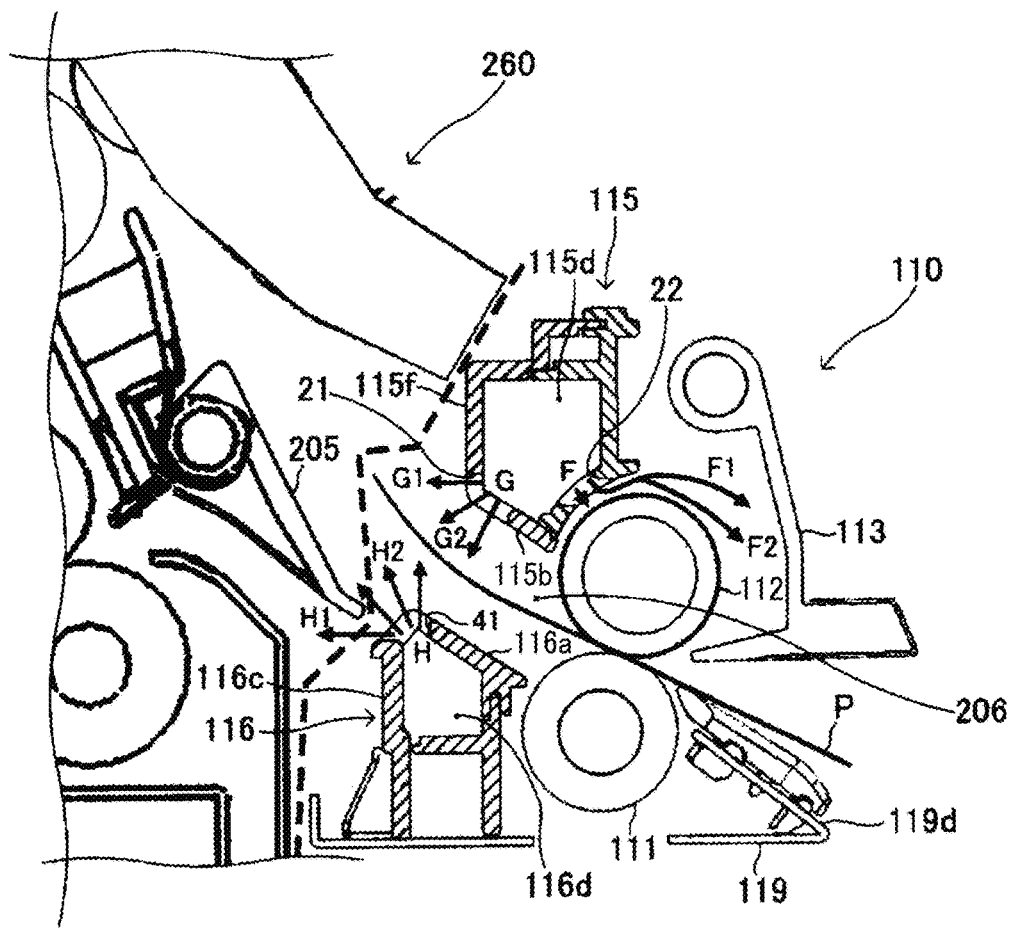
FIG. 4 is a cross-sectional view of the conveyance cooling unit illustrated together with a sheet being conveyed.

FIG. 4 is a transverse cross-sectional view illustrating the conveyance cooling unit 110 together with the sheet P being conveyed. The conveyance cooling unit 110 forms a conveyance nip region by contact of a drive roller 111 that performs rotational drive and a driven roller 112 pressed against the drive roller 111, so that the conveyance cooling unit 110 applies conveyance force to the sheet P sandwiched by the drive roller 111 and the driven roller 112 at the conveyance nip region.

The conveyance cooling unit 110 further includes an upper nip guide member 113, a lower nip guide member 119d, an upper air duct 115, and a lower air duct 116. The lower nip guide member 119d is mounted on a sheet metal frame 119. The sheet P that is conveyed immediately after the fixing device 106 and before reaching the conveyance cooling unit 110 is conveyed through between the upper nip guide member 113 and the lower nip guide member 119d to be guided toward the conveyance nip region.

The upper air duct 115 that functions as a first duct includes a plurality of upper conveyance passage blowout ports 21 and a plurality of roller blowout ports 22. The plurality of upper conveyance passage blowout ports 21 that functions as a first air blowing port is provided at given intervals in a sheet width direction (also referred to as an axial direction of the driven roller 112 and a duct longitudinal direction). The plurality of upper conveyance passage blowout ports 21 blows out air toward the sheet ejection passage 206 that is a sheet conveyance passage. The plurality of roller blowout ports 22 is also provided at given intervals in the sheet width direction (i.e., the axial direction of the driven roller 112 and the duct longitudinal direction). The plurality of roller blowout ports 22 faces the driven roller 112 that functions as a sheet conveying roller to blow out the air toward the driven roller 112.

Additionally, the lower air duct 116 that functions as a second duct includes a plurality of lower conveyance passage blowout ports 41 that functions as a second air blowout port to blow out the air toward the sheet ejection passage 206.

As indicated by arrow G in FIG. 4, the cooling air that has been conveyed to an upper air blowing passage 115d of the upper air duct 115 is blown from the plurality of upper conveyance passage blowout ports 21 onto an upper face of the sheet P that has passed through the conveyance nip region. Additionally, as indicated by arrow H in FIG. 4, the cooling air that has been conveyed to a lower air blowing passage 116d of the lower air duct 116 is blown from the lower conveyance passage blowout ports 41 onto a lower face of the sheet P that has passed through the conveyance nip region. Consequently, the sheet P heated at the fixing device 106 is cooled from both the upper face side and the lower face side of the sheet P.

The sheet P to which the image has been fixed by the fixing device 106 is conveyed to the conveyance nip region between the driven roller 112 and the drive roller 111 while the sheet P keeps a high temperature. In the conveyance nip region, the heat of the sheet P is transmitted to the driven roller 112 and the drive roller 111, and both the temperature of the driven roller 112 and the temperature of the drive roller 111 rise. In a case in which sheets P are continuously brought to pass the conveyance nip region, heat is exchanged from the sheets P to the pair of the rollers, which are the drive roller 111 and the driven roller 112, because the drive roller 111 and the driven roller 112 have the temperatures lower than the temperatures of the sheets P in an initial stage. However, the heat exchange is not performed on a sheet P being sandwiched (nipped) between the drive roller 111 and the driven roller 112 having the temperatures that have gradually risen, and therefore the sheet P is conveyed downstream in the sheet conveyance direction while the sheet P remains at the high temperature. Accordingly, the sheet temperature might not be lowered to a target temperature by the cooling with the air blown from the upper air duct 115 and the lower air duct 116, which might cause the blocking phenomenon in which sheets P stick to each other.

Also, in the case in which the sheets P are continuously brought to pass the conveyance nip region, it is likely that the surface temperature of the driven roller 112 or the surface temperature of the drive roller 111 rise close to a toner melting point. In a case in which the surface temperature of the driven roller 112 or the surface temperature of the drive roller 111 rises to the temperature close to the toner melting point, the toner on the sheet P may fixedly adhere to the surface of the drive roller 111 or the surface of the driven roller 112. Thus, when the toner fixedly adheres to the surface of the drive roller 111 or the surface of the driven roller 112, the conveyed sheet P might stick to the drive roller 111 or the driven roller 112, and the sheet P may be wound around the drive roller 111 or the driven roller 112 along an outer diameter of the drive roller 111 or the driven roller 112. Consequently, conveyance failure might occur, thereby causing sheet jam inside the fixing device 106. Particularly, the driven roller 112 contacts the sheet P on the side where the sheet P contacts the fixing roller 106*a* to heat the sheet P. Therefore, the temperature of the driven roller 112 easily rises higher than the temperature of the drive roller 111. Furthermore, since the toner image immediately after the fixing process contacts the driven roller 112, toner adhesion is likely to occur.

However, in the present embodiment, as indicated by arrow F in FIG. 4, the cooling air is directly conveyed from the roller blowout ports 22 provided on the upper air duct 115 and facing the driven roller 112, toward the driven roller 112 at a distance close to the driven roller 112. Consequently, the configuration is effective to constantly cool the driven roller 112. Accordingly, when the temperature of the driven roller 112 rises due to the sheet passage, the driven roller 112 is simultaneously cooled to restrain an increase in temperature of the driven roller 112. Consequently, the toner is restrained from adhering to the driven roller 112, and the conveyed sheet is prevented from being wound around the driven roller 112.

Additionally, while the sheet P is not conveyed, the heat of the drive roller 111 is transmitted to the driven roller 112, and therefore the temperature of the drive roller 111 is restrained from rising. Furthermore, when the heat of the drive roller 111 is transmitted the driven roller 112 to increase the temperature of the driven roller 112, the driven roller 112 is cooled simultaneously. Consequently, the temperature of the drive roller 111 is restrained from rising, and toner adhesion onto the surface of the drive roller 111 is prevented. Accordingly, the conveyed sheet is prevented from being wound around the driven roller 112.

Furthermore, since the temperature of the driven roller 112 and the temperature of the drive roller 111 are restrained from rising, heat exchange is excellently performed on the sheet P in the conveyance nip region to lower the temperature of the sheet P. Consequently, the cooling by blowing the air from the upper air duct 115 and the lower air duct 116 excellently lowers the sheet temperature to the target temperature and further restrains occurrence of the blocking phenomenon in which the sheets P stick to each other.

The driven roller 112 may include a metal roller. In a case in which a material of the driven roller 112 is metal, the roller temperature tends to be higher because thermal conductivity of the metal is higher than thermal conductivity of a rubber member. Therefore, with this configuration according to the present embodiment in which the driven roller 112 is directly cooled by the air, the temperature of the driven roller 112 is effectively restrained, the heat exchange with the sheet P is enhanced, and the sheet P is excellently cooled in the conveyance nip region.

The driven roller 112 may also be a member obtained by casing a surface of the driven roller 112 with a material such as a hollow film material to which the toner hardly adheres. Furthermore, the surface of the driven roller 112 is preferably conductive. The driven roller 112 having a conductive surface is efficacious to restrain electrical charge of the driven roller 112.

Moreover, the driven roller 112 may have a member obtained by covering an outer shape of a cored bar with a rubber member such as silicon, and by further casing the covered cored bar with a material such as perfluoroalkoxy alkane (PFA) to which the toner hardly adheres. At this time, it is preferable to adopt a method in which the rubber member is made conductive so as to ground static electricity to the earth when the static electricity is generated at the time of sheet passage. Consequently, the driven roller 112 is prevented from being electrically charged. The casing with the PFA is omitted when the rubber member is made to contain a material such as polytetrafluoroethylene (PTFE) to which the toner hardly adheres, or the surface of the driven roller 112 is coated with such a material.

Additionally, in the present embodiment, even when the sheet P is not present in the conveyance cooling unit 110, the cooling air is continuously blown out from the plurality of upper conveyance passage blowout ports 21, the plurality of roller blowout ports 22, and the plurality of lower conveyance passage blowout ports 41. Consequently, the temperature of the driven roller 112 is excellently restrained from rising. Furthermore, even when the sheet P is not present in the conveyance cooling unit 110, the cooling air is continuously blown out from the plurality of upper conveyance passage blowout ports 21 and the plurality of lower conveyance passage blowout ports 41. Therefore, the air blown out from the plurality of upper conveyance passage blowout ports 21 flows to the sheet ejection passage 206 and the sheet reverse passage 209 of a sheet ejection unit 260 located on a left side from a broken line in FIG. 4 and cools guides and pairs of sheet conveying rollers provided to the sheet ejection passage 206 and the sheet reverse passage 209 of the sheet ejection unit 260.

The plurality of upper conveyance passage blowout ports 21 is provided on a downstream side in a sheet conveyance direction (hereinafter, also simply referred to as a conveyance direction) of an upper sheet guide face 115*b* of the upper air duct 115 facing the upper face of the sheet P conveyed to the sheet ejection passage 206. The plurality of upper conveyance passage blowout ports 21 extends to a downstream end of the plurality of upper conveyance passage blowout ports 21, and further extends to a lower side of a downstream side wall 115*f* located on the downstream side of the upper air duct 115 in the sheet conveyance direction. With this configuration, a downstream end in the conveyance direction of each of the plurality of upper conveyance passage blowout ports 21 is located at a position more retreated from the sheet ejection passage 206, than the upper sheet guide face 115*b* is. Accordingly, the leading end of a sheet P is prevented from being caught at the downstream end in the conveyance direction of any of the plurality of upper conveyance passage blowout ports 21, and occurrence of sheet edge folding error or occurrence of conveyance failure is prevented.

Furthermore, since the plurality of upper conveyance passage blowout ports 21 extends to the lower side of the downstream side wall 115f, the cooling air is blown out toward the sheet ejection unit 260 located more on the left side than the broken line in FIG. 4 (arrow G1 in FIG. 4) as well as toward the lower air duct 116 (arrow G2 in FIG. 4). Consequently, the cooling air is blown onto a broad range of the upper face of the sheet P, and the temperature of the sheet P is excellently decreased.

Additionally, since the cooling air is blown toward the sheet ejection passage 206 and the sheet reverse passage 209 of the sheet ejection unit 260 (arrow G1 in FIG. 4), the cooling air is brought to excellently flow toward the guides and the pairs of sheet conveying rollers provided in the sheet ejection passage 206 and the sheet reverse passage 209 of the sheet ejection unit 260, and therefore the temperature of the sheet ejection unit 260 is restricted from rising.

Furthermore, similar to the plurality of upper conveyance passage blowout ports 21, the plurality of lower conveyance passage blowout ports 41 are provided on the downstream side in the conveyance direction of a lower sheet guide face 116a of the lower air duct 116 facing the lower face of the sheet P conveyed in the sheet ejection passage 206. The plurality of lower conveyance passage blowout ports 41 extends to a downstream end in the conveyance direction and further extends to an upper side of a downstream side wall 116c of the lower air duct 116. With this configuration, a downstream end of the plurality of lower conveyance passage blowout ports 41 is located at respective positions more retracted from the sheet ejection passage 206, than the lower sheet guide face 116a is. Therefore, the leading end of the sheet P is prevented from being caught at the downstream end in the conveyance direction of the plurality of lower conveyance passage blowout ports 41, and occurrence of sheet edge folding error or occurrence of conveyance failure is prevented.

Additionally, since the plurality of lower conveyance passage blowout ports 41 extends to the upper side of the downstream side wall 116c, the cooling air is blown out toward the sheet ejection passage 206 and the sheet reverse passage 209 of the sheet ejection unit 260 located more on the left side than the broken line in FIG. 4 (arrow H1 in FIG. 4) as well as toward the sheet ejection passage 206 (arrow H2 in FIG. 4). Consequently, a part of the cooling air blown out from the plurality of lower conveyance passage blowout ports 41 is brought to flow to the sheet ejection passage 206 and the sheet reverse passage 209 of the sheet ejection unit 260, and the guides and the pairs of sheet conveying rollers provided in the sheet ejection passage 206 and the sheet reverse passage 209 of the sheet ejection unit 260 are excellently cooled.

Furthermore, in the present embodiment, among the cooling air blown out from the plurality of roller blowout ports 22, the cooling air, which flows along the surface of the driven roller 112 and is directed to the upstream side in the conveyance direction as indicated by arrows F1 and F2 in FIG. 4, is blocked by the upper nip guide member 113. Consequently, the cooling air blown out from the plurality of roller blowout ports 22 is restrained from flowing to the fixing device 106, and therefore the temperature of the fixing device 106 (i.e., the fixing roller 106a) is restrained from falling (dropping). Accordingly, occurrence of fixing failure is prevented.

Figure 5:
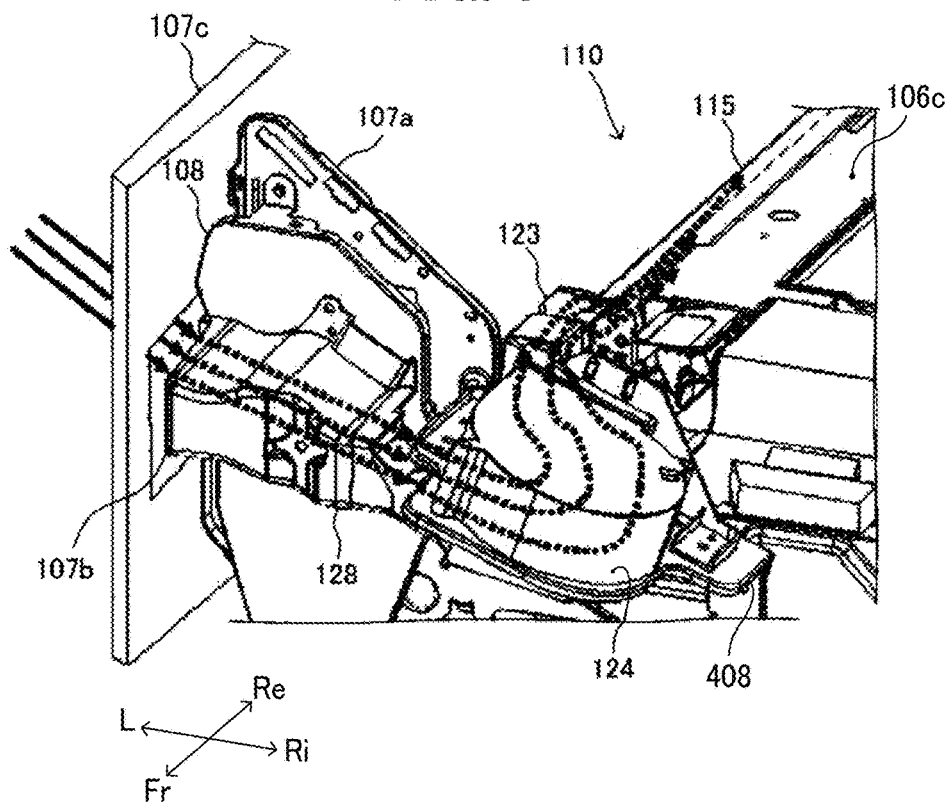
FIG. 5 is a partial perspective view of the vicinity of the conveyance cooling unit in a sheet conveying device according to an embodiment of the present disclosure.

FIG. 5 is a partial perspective view illustrating the vicinity of the conveyance cooling unit 110 of the sheet conveying device 100 detachable from the printing device 1. A frame 107c of the sheet conveying device 100 has an air suction port 107b for sucking outside air. A front side plate 107a is attached to the frame 107c. An air suction duct 128 of the conveyance cooling unit 110 is fixed to the front side plate 107a via a holding member 108.

The air suction duct 128 has one end that is coupled to an air suction portion of the air blowing fan 124. The air suction duct 128 has an opposite end having an opening facing the air suction port 107b of the frame 107c.

Since the air suction duct 128 is attached via the holding member 108 to the front side plate 107a of the sheet conveying device 100 that is detachable (removable) from the printing device 1, the air suction duct 128 follows movements, which are detachment and attachment operations, of the sheet conveying device 100 to move in the front-and-back directions of the image forming apparatus 1000.

While the printing device 1 performs a print job, the sheet conveying device 100 is inserted in the inner portion of the printing device 1. As the air blowing fan 124 rotates in this state, air suction force is generated in the air suction portion of the air blowing fan 124. Outside air is sucked into the air suction port 107b of the frame 107c by the air suction force as indicated by broken lines in FIG. 5, so that the outside air is taken inside the air blowing fan 124 via the air suction duct 128. Then, after being exhausted through the air exhausting portion of the air blowing fan 124, the outside air is blown into the upper air duct 115 and the lower air duct 116 via the communication pipe 123.

Figure 6:
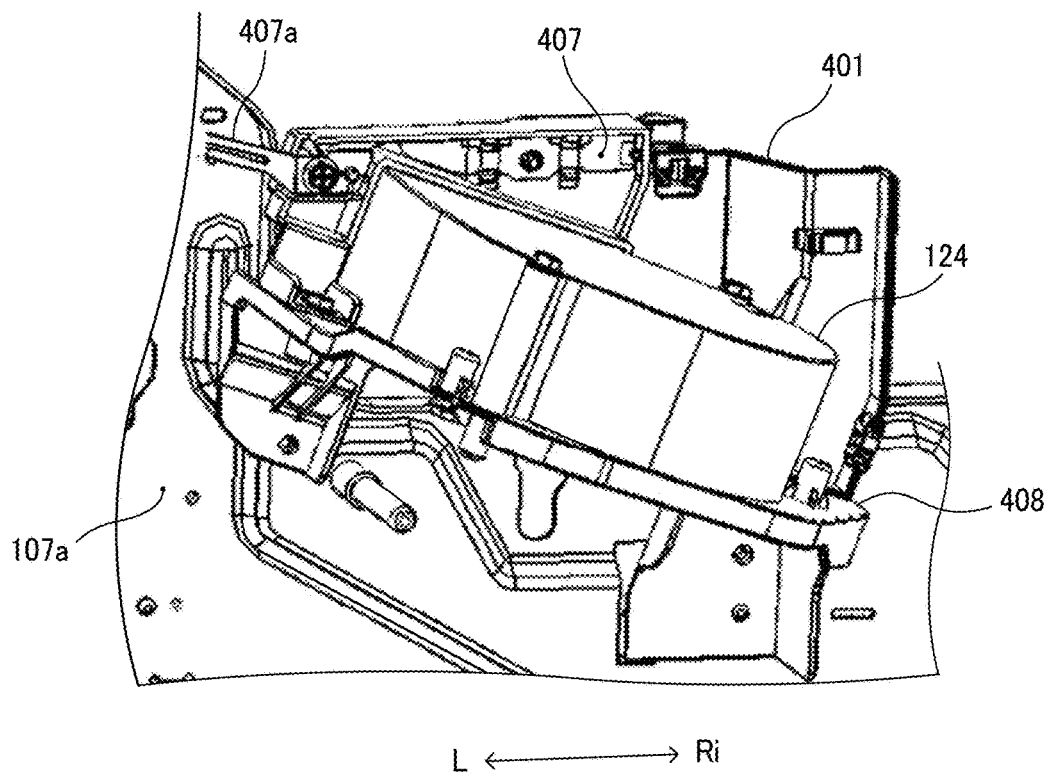
FIG. 6 is a front view of the vicinity of the conveyance cooling unit of the sheet conveying device from which an air suction duct is removed.

FIG. 6 is a front view of the vicinity of the conveyance cooling unit 110 of the sheet conveying device 100 from which the air suction duct 128 is removed according to an embodiment of the present disclosure. The air blowing fan 124 is fixed to the fan holder 408. The fan holder 408 is fixed to the sensor holder 401 serving as a first member, and the sensor holder 401 is fixed to the front side plate 107a. A grounding plate 407 illustrated in FIG. 6 is a grounding member made of a metallic material. One end 407a of the grounding plate 407 elastically abuts against the front side plate 107a made of a metallic material and electrically grounded. Thus, the grounding plate 407 is electrically grounded via the front side plate 107a. Details of the grounding plate 407 are described later.

Figure 7:
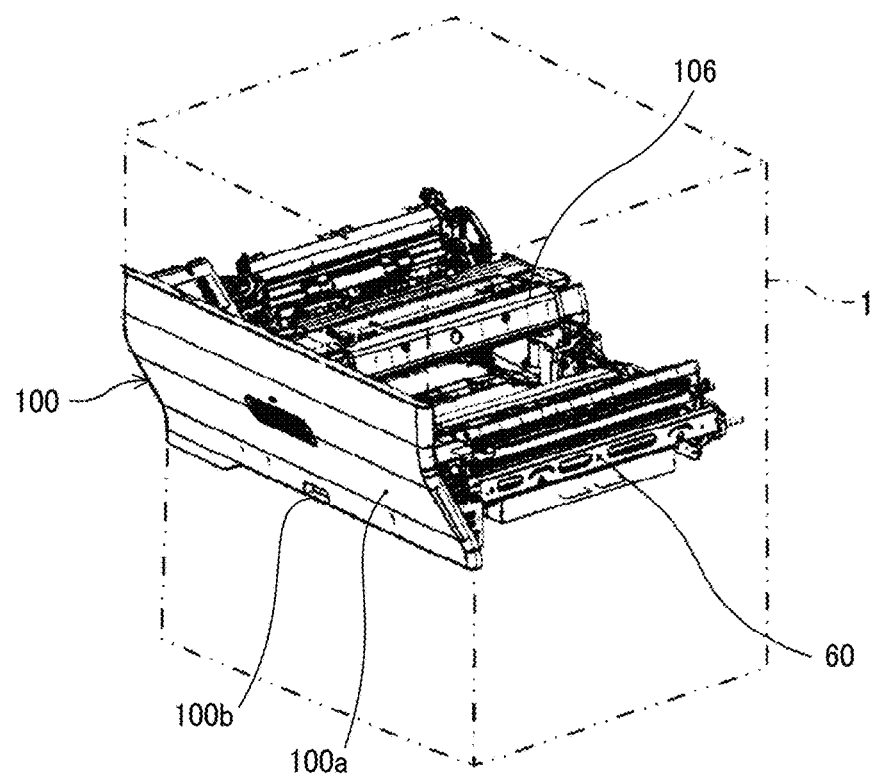
FIG. 7 is a perspective view of the sheet conveying device of the printing device in a state in which the sheet conveying device is located at a storage position inside the printing device as an apparatus body according to an embodiment of the present disclosure.
Figure 8:
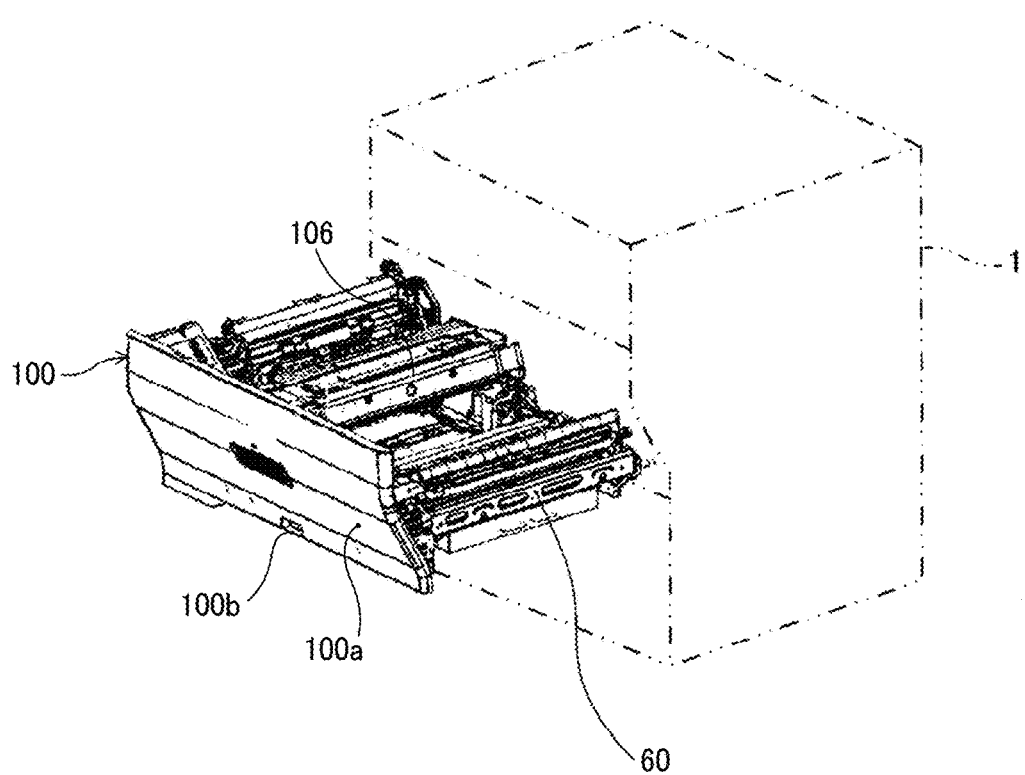
FIG. 8 is a perspective view of the sheet conveying device of FIG. 7 in a state in which the sheet conveying device is pulled out to a pulled-out position.

FIG. 7 is a perspective view of the sheet conveying device 100 of the printing device 1 in a state in which the sheet conveying device 100 is located at a storage position inside the printing device 1 as an apparatus body according to an embodiment of the present disclosure; FIG. 8 is a perspective view of the sheet conveying device 100 of the printing device 1 in a state in which the sheet conveying device 100 is pulled out to a pull-out position that is as a non-storage position located outside the printing device 1.

Figure 9:
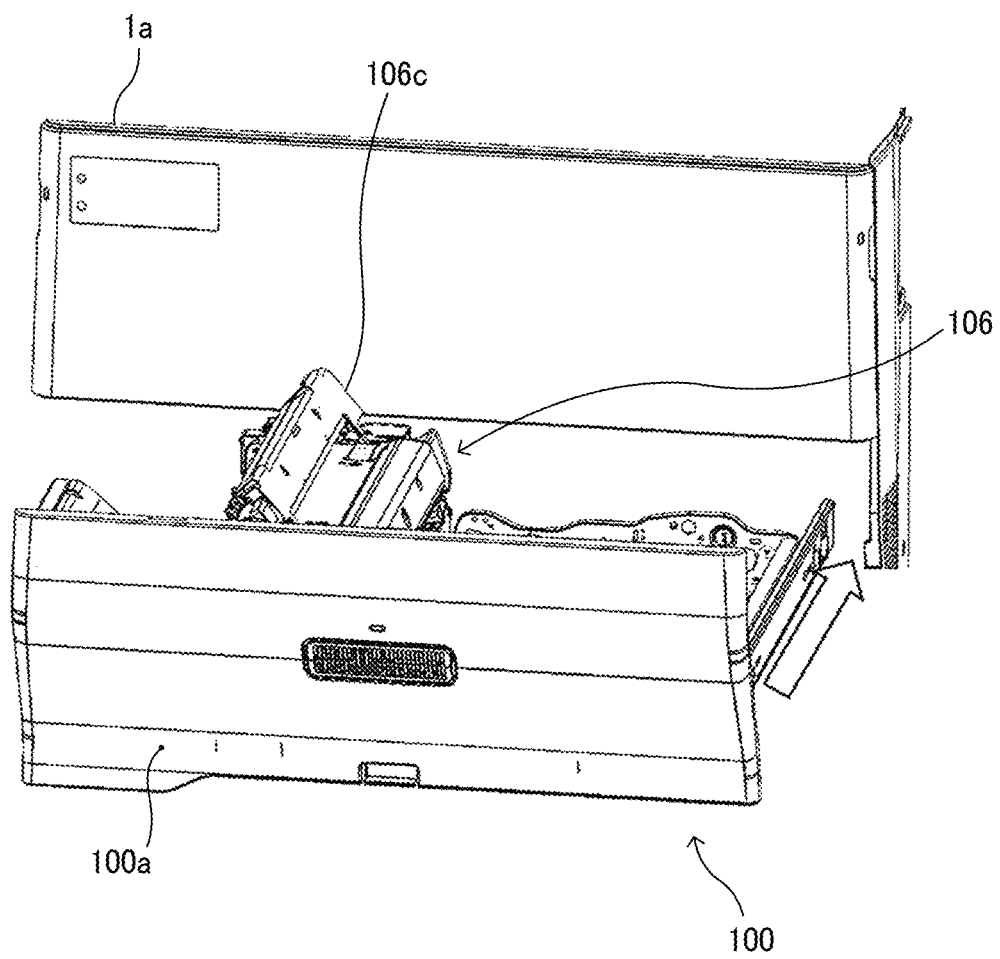
FIG. 9 is a schematic view of the sheet conveyance device in a state in which an upper fixing cover is open in a state in which the sheet conveying device is located at a pulled-out position.

In the present embodiment, the sheet conveying device 100 is provided to be slidable, with respect to the printing device 1, along a direction from the front side to the rear side of the image forming apparatus 1000, by slide rails 60 serving as a holder. When a sheet jam occurs in the fixing device 106, the user grips a handle 100b on a front cover 100a of the sheet conveying device 100 and pulls out the sheet conveying device 100 having the fixing device 106 from the storage position in the printing device 1 illustrated in FIG. 7 toward the front side of the printing device 1. The user pulls out the sheet conveying device 100 to a pull-out position (maximum pull-out position) illustrated in FIG. 8 and performs sheet-jam removal processing. At the pull-out position, the user opens the upper fixing cover 106c of the fixing device 106 as illustrated in FIG. 9. An upper fixing conveyance guide is attached to the upper fixing cover 106c to guide a sheet having passed through the fixing nip. When the upper fixing cover 106c is opened, the upper fixing conveyance guide rotates together with the upper fixing cover 106c. Accordingly, a sheet conveyance path on the downstream side of the fixing nip is exposed. Thus, the user can perform the sheet-jam removal processing on the sheet in the fixing device 106. After the completion of the sheet-jam removal processing, the user closes the upper fixing cover 106c and pushes the sheet conveying device 100 to the storage position illustrated in FIG. 7.

Figure 10A:
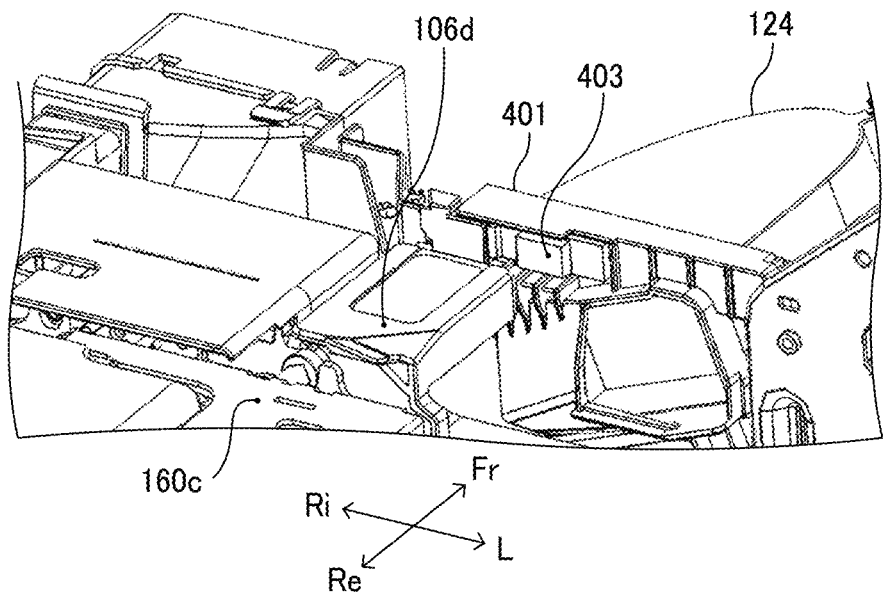
FIG. 10A is an enlarged perspective view of a part of the sheet conveying device in a state in which the upper fixing cover is closed.
Figure 10B:
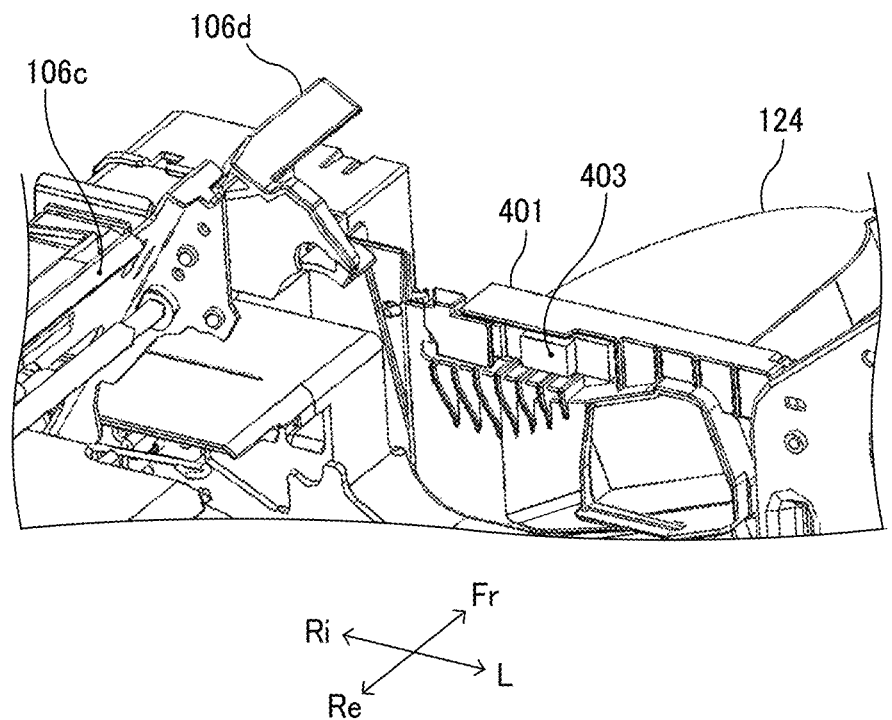
FIG. 10B is an enlarged perspective view of the part of the sheet conveying device in a state in which the upper fixing cover is opened.

FIG. 10A is an enlarged perspective view of a part of the sheet conveying device 100 in a state in which the upper fixing cover 106c is closed. FIG. 10B is an enlarged perspective view of a part of the sheet conveying device 100 in a state in which the upper fixing cover 106c is opened. A front end portion of the upper fixing cover 106c has a cover handle 106d to be gripped by a user to open and close the upper fixing cover 106c. An opening-closing sensor 403 formed of a reflective optical sensor that detects opening and closing of the upper fixing cover 106c is attached to the sensor holder 401.

As illustrated in FIG. 10A, in the state in which the upper fixing cover 106c is closed, the cover handle 106d closely faces the opening-closing sensor 403. Accordingly, light (for example, infrared light) from a light emitting portion of the opening-closing sensor 403 is reflected by the cover handle 106d, and the reflected light is received by a light receiving portion of the opening-closing sensor 403. Thus, it is detected that the upper fixing cover 106c is at the closed position.

As illustrated in FIG. 10B, when the user grips the cover handle 106d and opens the upper fixing cover 106c, the cover handle 106d does not face the opening-closing sensor 403. Accordingly, the light from the light emitting portion of the opening-closing sensor 403 is not received by the light receiving portion. Thus, it is detected that the upper fixing cover 106c is opened (not closed).

When the sheet conveying device 100 is pushed into the storage position inside the printing device 1 in a state in which the upper fixing cover 106c is opened, the upper fixing cover 106c may hit an outer cover 1a of the printing device 1 illustrated in FIG. 9. The hitting of the upper fixing cover 106c may apply a shearing force to the upper fixing cover 106c to plastically deform the upper fixing cover 106c. In the present embodiment, the sheet conveying device 100 can be stored at the storage position even when the upper fixing cover 106c is not completely closed (or is half-opened). As described above, when the upper fixing cover 106c is not completely closed (or is half-opened), the upper fixing conveyance guide attached to the upper fixing cover 106c is not placed at the sheet guide position. Accordingly, when image formation is performed in a state in which the upper fixing cover 106c is not completely closed (or is half-opened), the sheet that has passed through the fixing nip may not satisfactorily guided, and jamming of the sheet may occur.

Therefore, in the present embodiment, when the opening-closing sensor 403 detects that the upper fixing cover 106c is not closed, the control panel 400 as an operation display unit displays that the upper fixing cover 106c is opened. Such a configuration can prevent the sheet conveying device 100 from being pushed into the storage position inside the printing device 1 in a state in which the user does not close the upper fixing cover 106c. Further, when the opening-closing sensor 403 detects that the upper fixing cover 106c is not closed, the image forming operation is prohibited. Thus, the sheet having passed through the fixing nip is not guided and jamming of the sheet is prevented.

Further, for example, the sheet conveying device 100 may be prevented from being pushed into the storage position inside the printing device 1 when the opening-closing sensor 403 detects that the upper fixing cover 106c is not closed. Such a configuration can prevent the sheet conveying device 100 from being pushed into the storage position inside the printing device 1 in a state in which the user does not close the upper fixing cover 106c.

Figure 11:
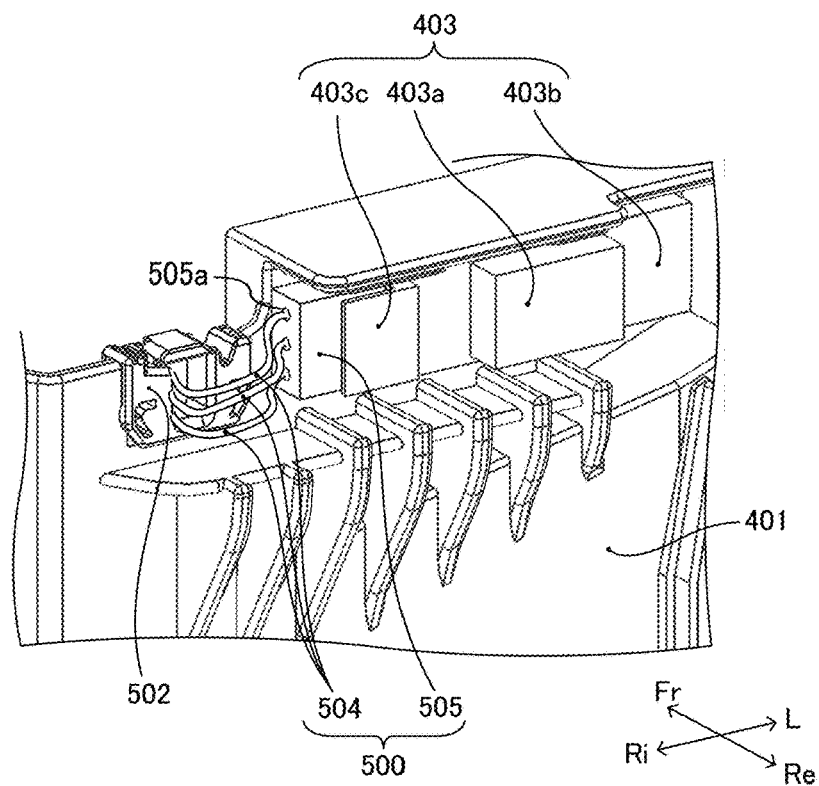
FIG. 11 is a perspective view illustrating the vicinity of an opening-closing sensor according to a comparative example.

FIG. 11 is a perspective view illustrating the vicinity of an opening-closing sensor 403 according to a comparative example, to which a conventional-type harness holding member 502 is attached. The opening-closing sensor 403 includes a sensor portion 403a and a board 403b. The sensor portion 403a includes a light emitting portion and a light receiving portion. The sensor portion 403a is mounted on the board 403b. A connector 505 of a harness 500 is connected to a connection terminal 403c provided at one end of the board 403b.

The harness holding member 502 for holding a plurality of electric wires 504 of the harness 500 is attached to the sensor holder 401. The plurality of electric wires 504 are inserted into and held by holding holes of the harness holding member 502 and are wired from one side of the sensor holder 401 facing the fixing device 106 to the opposite side of the sensor holder 401.

In FIG. 11, the electric wires 504 and the connector 505 of the harness 500 are exposed. The opening-closing sensor 403 is disposed in the vicinity of the cover handle 106d in order to detect the cover handle 106d operated by the user. Accordingly, the connector 505 connected to the connection terminal 403c of the opening-closing sensor 403 is also disposed in the vicinity of the cover handle 106d. The cover handle 106d is gripped by a user when the user opens and closes the upper fixing cover 106c. Therefore, when the user holds the cover handle 106d to open and close the upper fixing cover 106c, the electric wires 504 of the harness 500 may be hooked by the user's finger. When the hooked electric wires 504 are removed from the finger, the electric wires 504 might be pulled and detached from the connector 505, which might damage the harness 500. In addition, when the hooked electric wires 504 are removed from the finger, the connector 505 might be detached from the connection terminal 403c of the opening-closing sensor 403 due to pulling of the electric wire 504, which might cause a disconnected state or a semi-connected state and consequently cause erroneous detection of the opening-closing sensor 403 due to poor connection.

When the user accesses the cover handle 106d to open and close the upper fixing cover 106c, the user's finger approaches the connector 505. At this time, static electricity might be discharged from the finger toward a wire insertion hole 505a of the connector 505. The static electricity discharged toward the wire insertion hole 505a might energize the opening-closing sensor 403 via the connector 505 and electrostatically damage the opening-closing sensor 403.

In order to prevent discharge of static electricity to the connector 505 and catching of the electric wire 504, a cover member that covers the electric wire 504 and the connector 505 of the harness 500 may be separately provided. However, an increase in the number of components may lead to an increase in the cost of the apparatus, and an increase in the number of assembly steps may lead to an increase in the manufacturing cost. Therefore, in the present embodiment, the harness holding member is provided with a cover part that covers the connector 505 and the electric wires 504 of the harness 500. Hereinafter, features of the present embodiment are further described.

Figure 12:
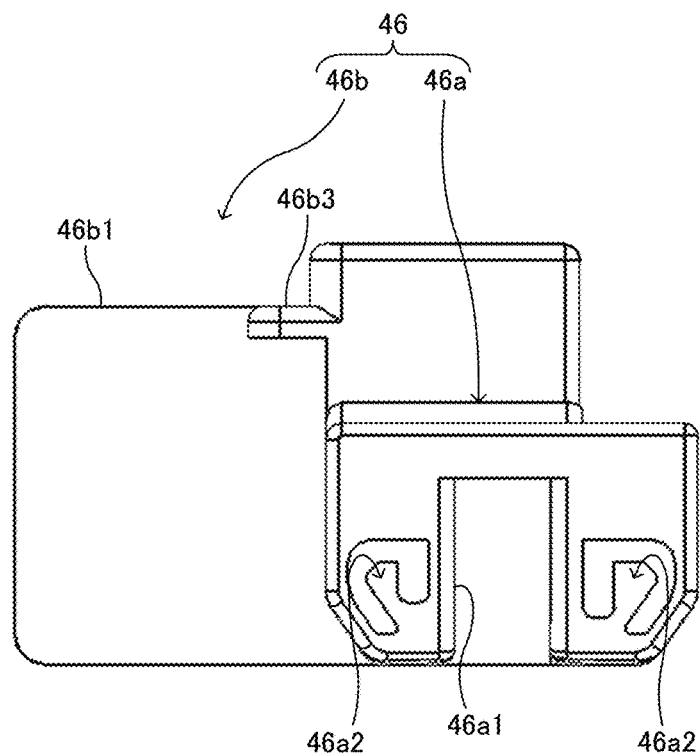
FIG. 12 is a front view of a harness holding member according to an embodiment of the present disclosure.
Figure 13:
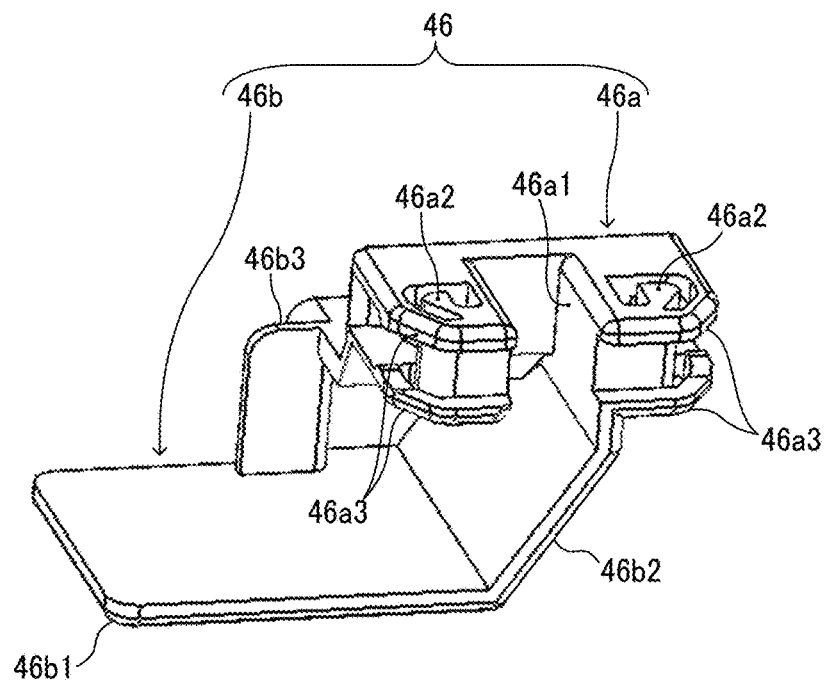
FIG. 13 is a perspective view of the harness holding member as viewed from below.
Figure 14:
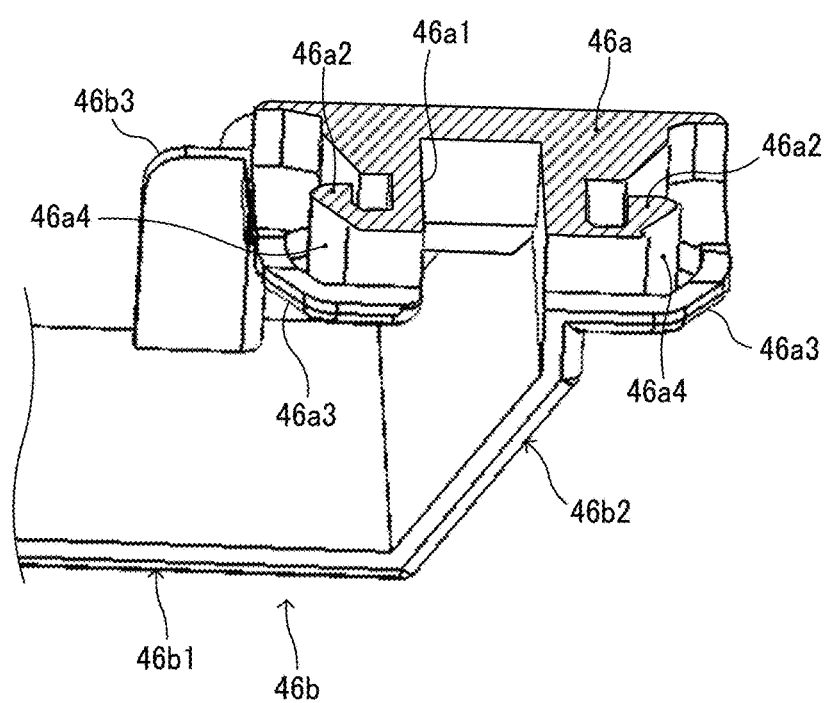
FIG. 14 is a cross-sectional perspective view illustrating a cross section of an attachment part of the harness holding member.

FIG. 12 is a front view of a harness holding member 46 according to the present embodiment. FIG. 13 is a perspective view of the harness holding member 46 according to the present embodiment viewed from below. FIG. 14 is a cross-sectional perspective view illustrating a cross section of an attachment part 46a of the harness holding member 46. The harness holding member 46 as a second member according to the present embodiment has the attachment part 46a and a cover part 46b. The attachment part 46a is attached to an attachment groove 401b (see FIG. 15) provided in an upper portion of the sensor holder 401 serving as the first member, and holds the electric wire 504 of the harness 500 between the attachment groove 401b and the attachment part 46a The cover part 46b covers the connector 505 and the electric wires 504 of the harness 500 on a side (fixing device side) on which the fixing device 106 is located with respect to the sensor holder 401.

The cover part 46b includes a harness cover part 46b1, a wire guide portion 46b2, and an overlap portion 46b3. The harness cover portion 46b1 covers the connector 505 of the harness 500 and the electric wires 504 located on the fixing device side on which the fixing device 106 is located with respect to the sensor holder 401.

The wire guide portion 46b2 covers the electric wires 504 of the harness 500 and guides the electric wires 504 to the wire holding groove 46a1 of the attachment part 46a. The wire guide portion 46b2 is an inclined surface that approaches the attachment part 46a as the distance from the connector 505 increases. One end of the wire guide portion 46b2 is connected to the harness cover portion 46b1, and the other end of the wire guide portion 46b2 is connected to a side wall of the wire holding groove 46a1 on a first side opposite to a second side of the wire holding groove 46a1 closer to the opening-closing sensor 403.

A part of the overlap portion 46b3 enters below an upper sensor cover portion 401a (see FIG. 16) of the sensor holder 401, faces the connector 505 from above, and covers a part of the connector 505 from above.

The attachment part 46a includes a wire holding groove 46a1, a pair of locking claw portions 46a2, and a pair of holding portions 46a3. The pair of locking claw portions 46a2 are provided across the wire holding groove 46a1. The pair of holding portions 46a3 (see FIG. 13) are provided to face each other in the front-rear direction and configured to hold the harness holding member 46 in the front-rear direction with respect to the sensor holder 401.

The wire holding groove 46a1 is a rectangular groove that is open in the front-rear direction and the lower direction, and the electric wires 504 of the harness 500 are inserted through the wire holding groove 46a1 in the front-rear direction. The electric wires 504 are held by the attachment groove 401b and the wire holding groove 46a1.

As illustrated in FIG. 14, each of the pair of locking claw portions 46a2 has a shape that extends in parallel in the left-right direction and in a direction away from the wire holding groove 46a1 and then extends obliquely upward. The distal end of each locking claw portion 46a2 is elastically deformable in the left-right direction.

As illustrated in FIGS. 13 and 14, the pair of holding portions 46a3 is provided so as to surround the pair of locking claw portions 46a2. When the attachment part 46a is attached to the attachment groove 401b, an edge of the attachment groove 401b enters between the pair of holding portions 46a3 opposite each other. Accordingly, the harness holding member 46 is held in the front-rear direction with respect to the sensor holder 401 by the pair of holding portions 46a3.

Figure 15:
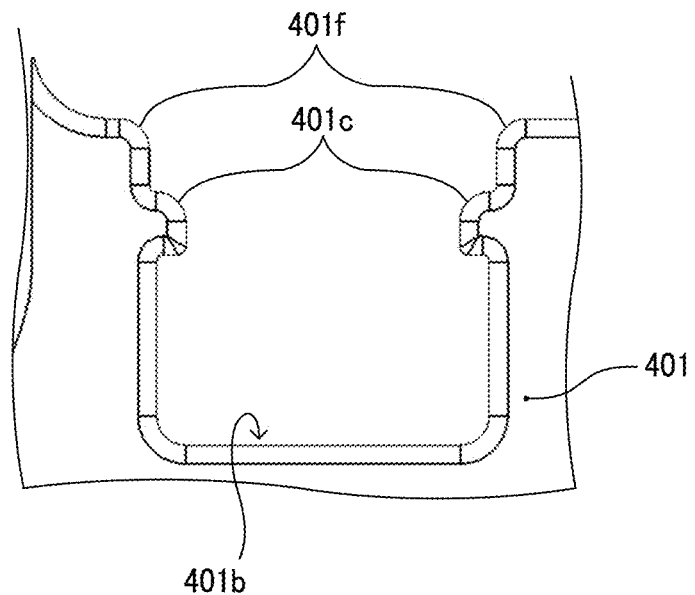
FIG. 15 is a schematic view illustrating an attachment groove of a sensor holder.

FIG. 15 is a schematic view illustrating the attachment groove 401b of the sensor holder 401. The attachment groove 401b is a rectangular groove that is open in the front-rear direction and the upper direction. Locking projections 401c are provided on both side walls of the attachment groove 401b. Upper end portions 401f of the attachment groove 401b are rounded.

Figure 16:
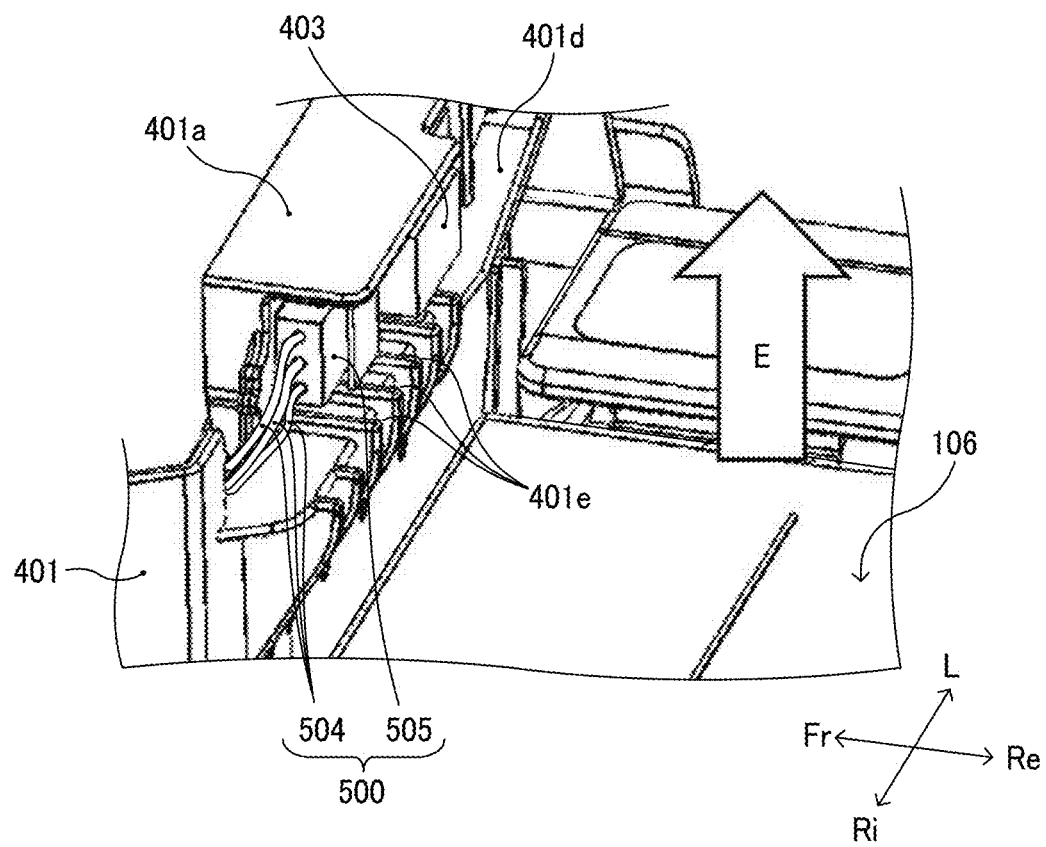
FIG. 16 is a perspective view illustrating the vicinity of the sensor holder in a state in which the harness holding member is removed.

FIG. 16 is a perspective view illustrating the vicinity of the sensor holder in a state in which the harness holding member 46 is removed. The sensor holder 401 has the upper sensor cover portion 401a that faces the opening-closing sensor 403 and the connector 505 from above and covers the opening-closing sensor 403 and the connector 505 from above. The sensor holder 401 includes a lower sensor cover portion 401d that faces the opening-closing sensor 403 and the connector 505 from below and covers the opening-closing sensor 403 and the connector 505 from below. The lower sensor cover portion 401d extends to the attachment groove 401b and faces, from below, the plurality of electric wires 504 located on the fixing device side (or the rear side) on which the fixing device 106 is located with respect to the sensor holder 401.

The sensor holder 401 is provided with a plurality of fixing guide ribs 401e. An upper end of the fixing guide rib 401e is connected to the lower sensor cover portion 401d and is inclined so as to be located on the front side (so that the amount of protrusion from the side wall of the sensor holder 401 decreases) as the upper end goes downward.

The fixing device 106 is attachable to and detachable from the sheet conveying device 100. In the replacement of the fixing device 106, after the sheet conveying device 100 is pulled out from the printing device 1, the fixing device 106 is lifted up from the sheet conveying device 100 and removed from the sheet conveying device 100 as indicated by arrow E in FIG. 16. An unused fixing device 106 is lowered and installed into the sheet conveying device 100.

In the present embodiment, when the fixing device 106 is taken out from the sheet conveying device 100, the fixing device 106 is guided by the fixing guide ribs 401e in a direction away from the opening-closing sensor 403. When the fixing device 106 is taken out from the sheet conveying device 100, such a configuration can restrain the fixing device 106 from colliding with the opening-closing sensor 403 and the connector 505, restrain the opening-closing sensor 403 and the connector 505 from being externally damaged, and restrain the opening-closing sensor 403 and the connector 505 from being damaged.

Even if a member of the fixing device 106 enters between the fixing guide ribs 401e when the fixing device 106 is taken out from the sheet conveying device 100, the above-described configuration can prevent the member from colliding with the lower sensor cover portion 401d and colliding with the opening-closing sensor 403 or the connector 505. Thus, external damage to the opening-closing sensor 403 and the connector 505 can be further restrained.

Further, in the present embodiment, the lower sensor cover portion 401d also covers, from below, the plurality of electric wires 504 located on the fixing device side (or the rear side) on which the fixing device 106 is located with respect to the sensor holder 401. Accordingly, when the fixing device 106 is taken out from the sheet conveying device 100, a member of the fixing device 106 can be prevented from being caught from below by the plurality of electric wires 504 positioned on the fixing device side (rear side) of the harness 500. Accordingly, damage of the harness due to external load to the electric wires 504 and disconnection of the connector 505 from the opening-closing sensor 403 cam be restrained.

Further, the upper sensor cover portion 401a can prevent the fixing device 106 from colliding with the opening-closing sensor 403 and the connector 505 from above when the fixing device 106 is lowered and installed into the sheet conveying device 100. When the fixing device 106 is lowered and installed into the sheet conveying device 100, such a configuration can restrain the opening-closing sensor 403 and the connector 505 from being externally damaged, and restrain the opening-closing sensor 403 and the connector 505 from being damaged.

Further, in the present embodiment, a plurality of ribs are provided on the upper surface of the lower sensor cover portion 401d at positions facing the connector 505 and the opening-closing sensor 403. Such a configuration can prevent a finger or the like from being thrust into a space between the lower sensor cover portion 401d and the opening-closing sensor 403 or a space between the lower sensor cover portion 401d and the connector 505.

Figure 17:
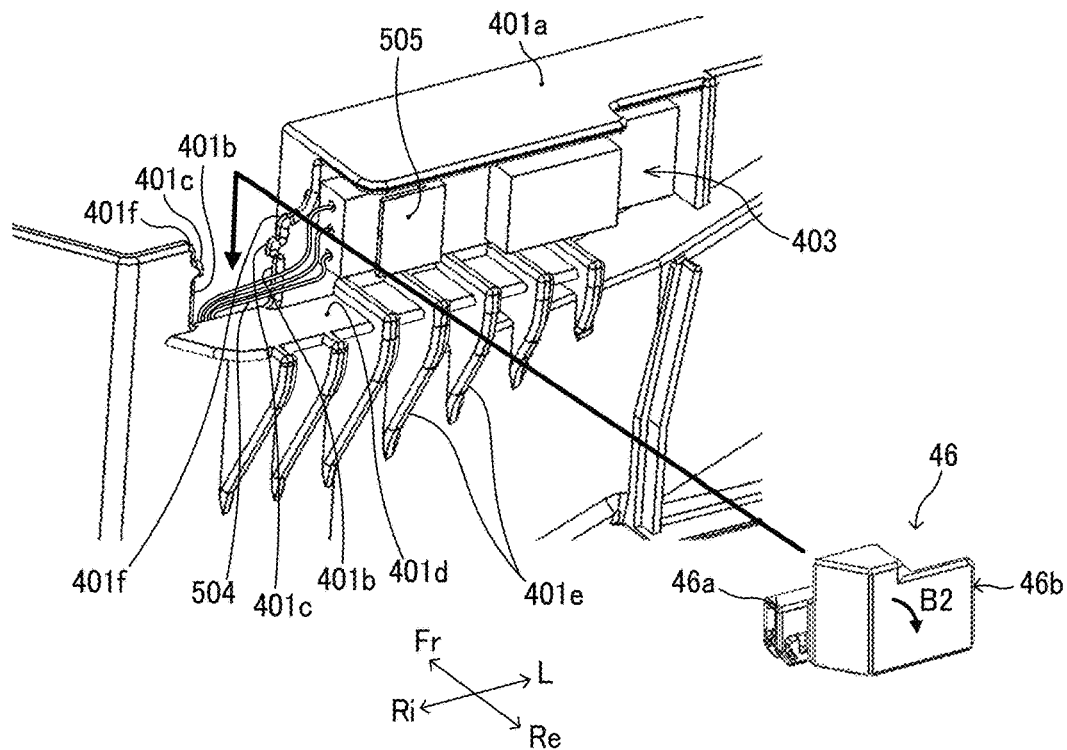
FIG. 17 is a perspective view illustrating a state in which the harness holding member is attached to the attachment groove as viewed from the rear side.
Figure 18:
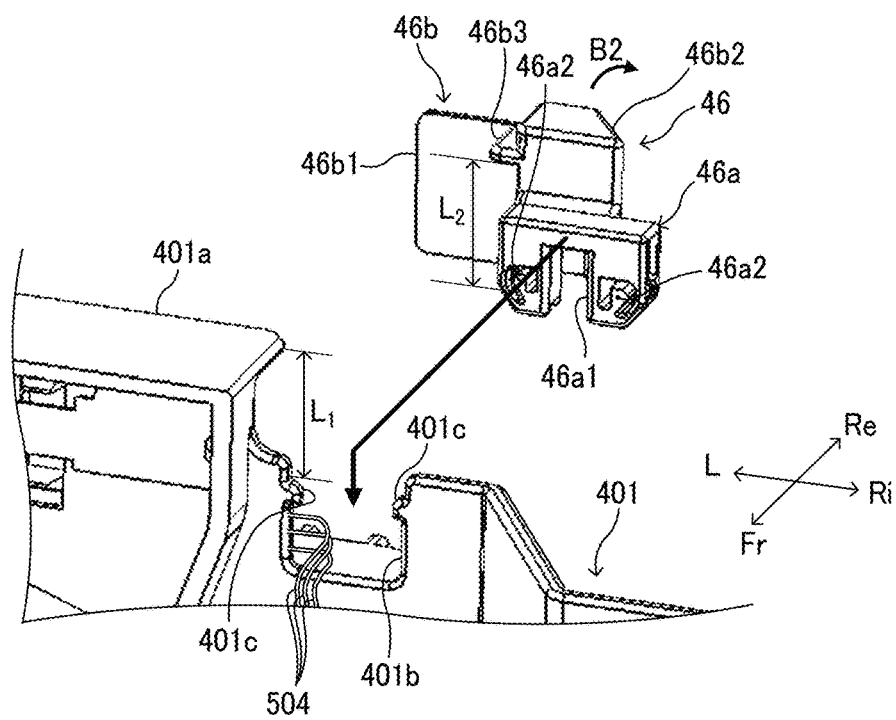
FIG. 18 is a perspective view illustrating a state in which the harness holding member is attached to the attachment groove as viewed from the rear side.

Next, attachment of the harness holding member 46 according to the present embodiment to the attachment groove 401b of the sensor holder 401 is described. FIG. 17 is a perspective view of a state in which the harness holding member 46 is attached to the attachment groove 401b as viewed from the rear side (fixing device side). FIG. 18 is a perspective view of a state in which the harness holding member 46 is attached to the attachment groove 401b as viewed from the front side.

The harness holding member 46 according to the present embodiment has an overlap portion 401a that enters below the upper sensor cover portion 46b3. Accordingly, even if an attempt is made to attach the harness holding member 46 to the attachment groove 401b from directly above the attachment groove 401b, the overlap portion 46b3 collides with the upper cover portion 401a, thus hampering the harness holding member 46 from being attached to the attachment groove 401b.

Therefore, in the present embodiment, the harness holding member 46 is inserted into the attachment groove 401b from the rear side in a state in which the harness holding member 46 is inclined such that the upper side is positioned further to the rear side than the lower side as indicated by arrow B2 in FIGS. 17 and 18. For example, in a state in which the harness holding member 46 is inclined, the harness holding member 46 is inserted into the attachment groove 401b so that an upper end of an edge of the attachment groove 401b enters between the pair of holding portions 46a3 (see FIG. 13) of the harness holding member 46.

The upper end portions 401f of the attachment groove 401b are rounded. Accordingly, even in a state in which the harness holding member 46 is slightly displaced to the left or right with respect to the attachment groove 401b, the harness holding member 46 is guided by the rounded shapes of the upper end portions 401f of the attachment groove 401b, thus allowing the harness holding member 46 to be inserted into the attachment groove 401b.

When the harness holding member 46 is inserted into the attachment groove 401b, the inclined surfaces 46a4 (see FIG. 14) of the locking claw portions 46a2 come into contact with the upper ends of the locking projections 401c of the attachment groove 401b. Thus, when the locking claw portions 46a2 come into contact with the locking projections 401c, the harness holding member 46 is raised.

In the present embodiment, as illustrated in FIG. 18, the distance $L_2$ from the upper end of the overlap portion 46b3 to the lower end of the locking claw portion 46a2 is shorter than the distance $L_1$ from the lower end of the upper sensor cover portion 401a to the upper end of the locking projection 401c. Accordingly, when the harness holding member 46 is raised, the overlap portion 46b3 enters below the upper sensor cover portion 401a.

After the harness holding member 46 is raised, the harness holding member 46 is pushed downward, and the harness holding member 46 is attached to the attachment groove 401b.

Figure 19:
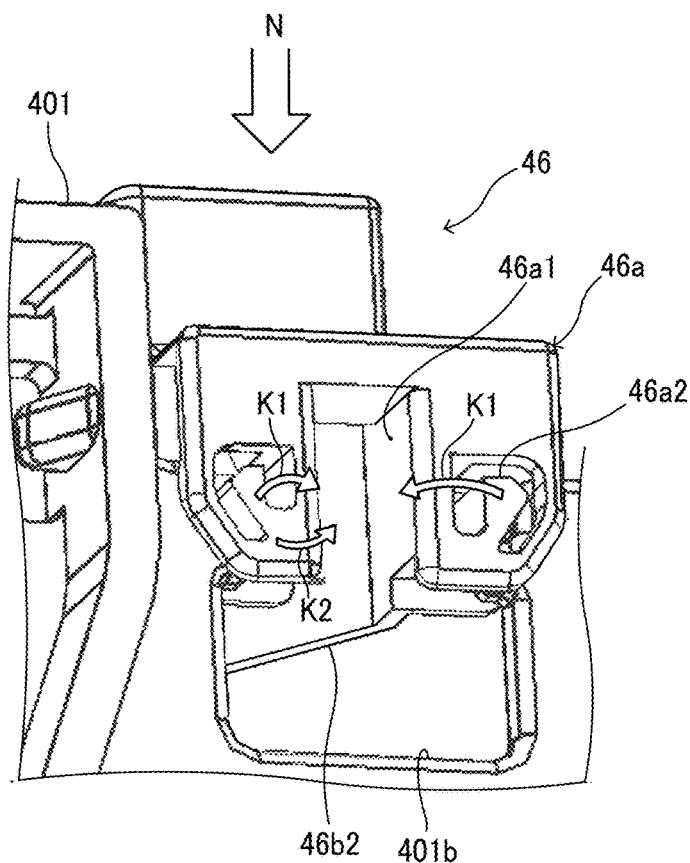
FIG. 19 is a schematic view illustrating a state in which the harness holding member is pushed downward and attached to the attachment groove.

FIG. 19 is a schematic view illustrating a state in which the harness holding member 46 is pushed downward and attached to the attachment groove 401b. As illustrated by arrow N in FIG. 19, when the harness holding member 46 is pushed downward, the pair of locking claw portions 46a2 are pressed by the locking projections 401c and elastically deformed in directions indicated by arrows K1 in FIG. 19. When the locking claw portions 46a2 are pressed by the locking projections 401c, a wall portion of the attachment part 46a on the opening-closing sensor 403 side (i.e., the side closer to the opening-closing sensor 403) is elastically deformed in a direction indicated by arrow K2 in FIG. 19. On the other hand, since the wire guide portion 46b2 is connected to a wall portion of the attachment part 46a on the side opposite to the opening-closing sensor 403 side, the wall portion the side opposite to the opening-closing sensor 403 side has a higher rigidity than the wall portion on the opening-closing sensor 403 side. Accordingly, the wall portion of the attachment part 46a on the side opposite to the opening-closing sensor 403 side is not elastically deformed.

The locking claw portions 46a2 and the wall portion of the attachment part 46a on the opening-closing sensor 403 side are elastically deformed. Accordingly, the locking claw portions 46a2 ride over the locking projections 401c, and the locking claw portions 46a2 are positioned lower than the locking projections 401c. Thus, the locking claw portions 46a2 are locked by the locking projections 401c, and the harness holding member 46 is attached to the attachment groove 401b.

Figure 20:
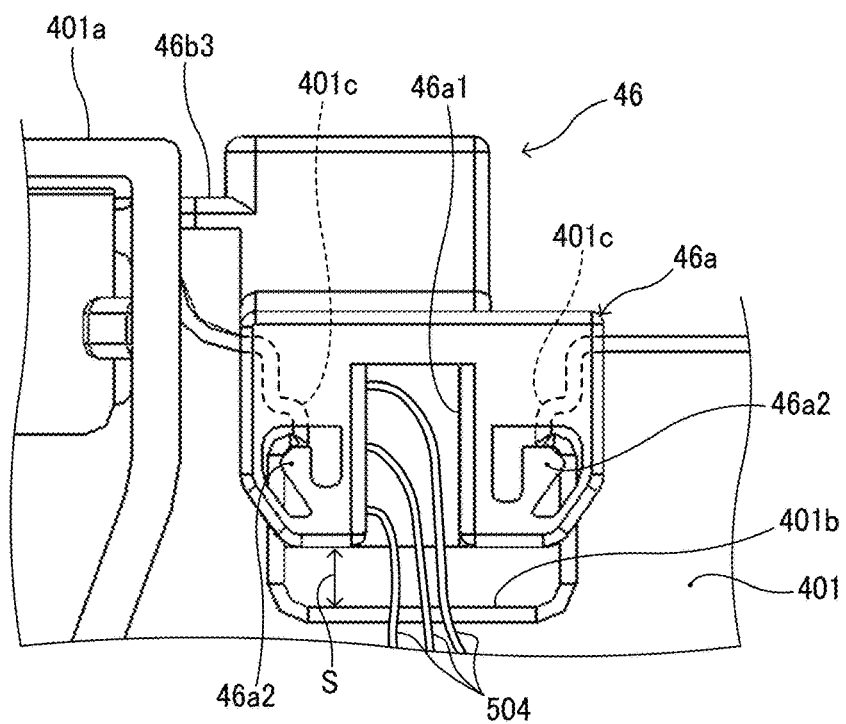
FIG. 20 is an enlarged view of a part of the sensor holder to which the harness holding member is attached as viewed from the front side.

FIG. 20 is an enlarged view of a main part of the sensor holder 401 to which the harness holding member 46 is attached as viewed from the front side. The electric wires 504 of the harness 500 are inserted through a convex space surrounded by the attachment part 46a and the attachment groove 401b and are held by the attachment part 46a and the attachment groove 401b. In other words, in the present embodiment, the sensor holder 401 and the harness holding member 46 serve as a wiring holder that holds the electric wires 504.

In the present embodiment, the groove depth of the attachment groove 401b is greater than the height of the attachment part 46a of the harness holding member 46. Accordingly, as illustrated in FIG. 20, a predetermined clearance S is formed between the bottom portion of the attachment groove 401b and the attachment part 46a.

As illustrated in FIGS. 16 and 17, the harness holding member 46 is attached to the attachment groove 401b in a state in which the electric wires 504 of the harness 500 straddle the attachment groove 401b. In the case of a configuration in which the attachment part 46a is in contact with the bottom portion of the attachment groove 401b, when the harness holding member 46 is attached to the attachment groove 401b, the electric wires 504 might be sandwiched between the bottom portion of the attachment groove 401b and the attachment part 46a and cause a failure of disconnection. In order to prevent such a failure, when an operator attaches the harness holding member 46 to the attachment groove 401b while taking care so that the electric wires 504 enter the wire holding groove 46a1, assembling workability is not so good.

Hence, in the present embodiment, the predetermined clearance S is formed between the bottom portion of the attachment groove 401b and the attachment part 46a. Such a configuration can prevent the electric wires 504 from being sandwiched between the bottom portion of the attachment groove 401b and the attachment part 46a, thus allowing the occurrence of disconnection to be avoided. Such a configuration allows an operator to attach the harness holding member 46 to the attachment groove 401b without paying attention to whether the electric wires 504 are inserted into the wire holding groove 46a1, thus improving the assembling workability. The electric wires 504 positioned in the clearance S may be inserted into the wire holding groove 46a1 after the harness holding member 46 is attached to the attachment groove 401b.

In the present embodiment, the wire guide portion 46b2 is inclined so as to approach the attachment part 46a as the distance from the connector 505 increases. Accordingly, the electric wires 504 on the rear side with respect to the sensor holder 401 are smoothly bent by the wire guide portion 46b2, and the electric wires 504 can be routed to the wire holding groove 46a1 in a gentle curve.

The locking claw portion 46a2 has an inclined shape such that the upper portion is positioned in a direction farther from the wire holding groove 46a1 than the lower portion. Accordingly, when the harness holding member 46 is pulled out from the attachment groove 401b, the locking claw portions 46a2 are elastically deformed by the pressing force from the locking projections 401c so that the distal ends of the locking claw portions 46a2 are positioned on the base side of the locking projections 401c (i.e., are moved away from the wire holding groove 46a1). Such a configuration can prevent the harness holding member 46 from being easily detached after the harness holding member 46 is attached to the attachment groove 401b.

Furthermore, in the present embodiment, the wire guide portion 46b2 is connected to the wall portion of the attachment part 46a on the side opposite to the opening-closing sensor 403 side, and the wall portion of the attachment part 46a on the side opposite to the opening-closing sensor 403 side is less likely to be elastically deformed. Such a configuration can further prevent the harness holding member 46 from being easily detached from the attachment groove 401b.

As described above, in the present embodiment, the harness holding member 46 is configured not to be easily detached from the attachment groove 401b. Accordingly, when an external force in a direction in which the harness holding member 46 is detached from the attachment groove 401b is unexpectedly applied to the harness holding member 46 at the time of jam removal operation or the like, detachment of the harness holding member 46 from the attachment groove 401b can be restrained. Accordingly, such a configuration can prevent the harness holding member 46 from being removed from the attachment groove 401b and lost. In addition, when the detached harness holding member 46 is re-assembled to the attachment groove 401b, the above-described configuration can restrain electrostatic breakdown of the opening-closing sensor 403 due to electrostatic discharge from the finger to the connector 505 when the finger approaches the connector 505.

Figure 21:
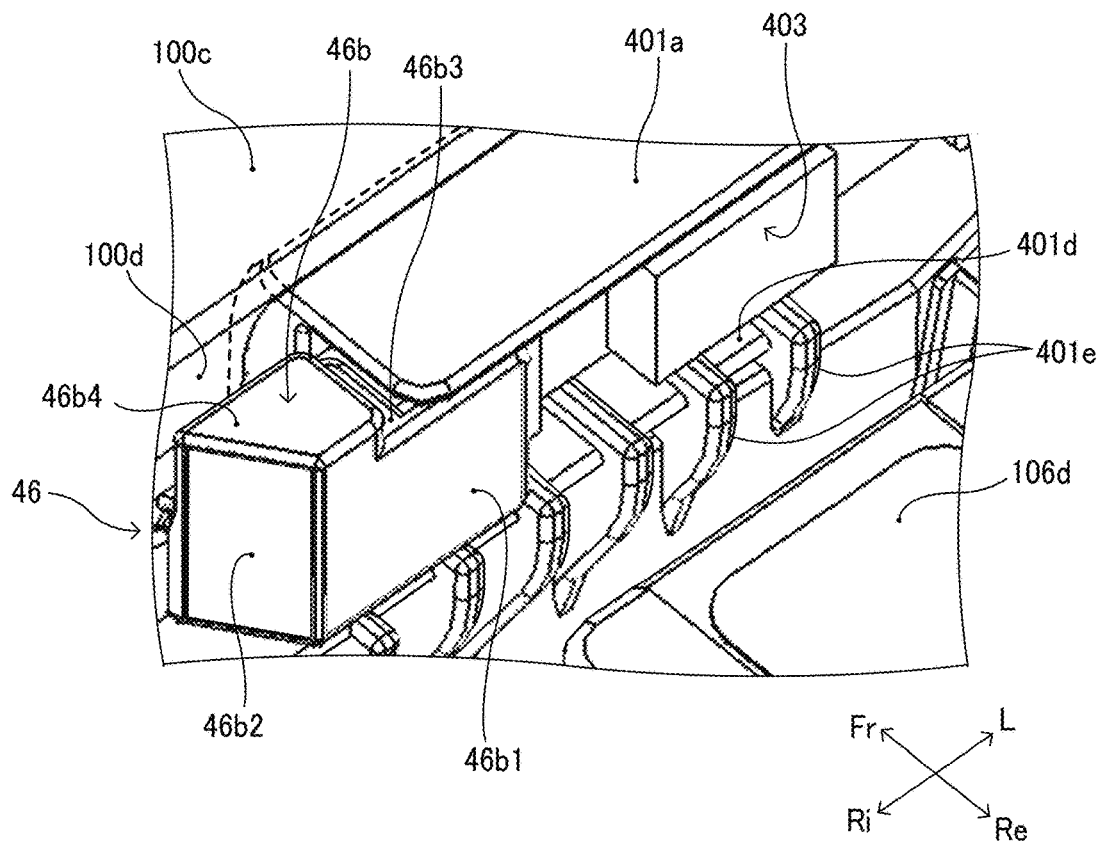
FIG. 21 is a perspective view of the vicinity of the sensor holder to which the harness holding member is attached.
Figure 22:
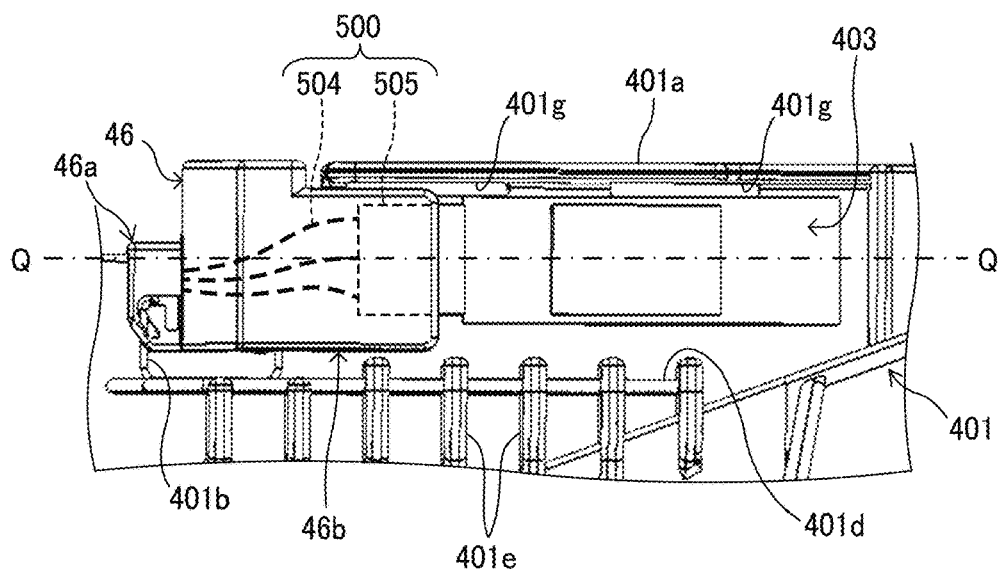
FIG. 22 is a front view of the sensor holder to which the harness holding member is attached as viewed from the rear side.
Figure 23:
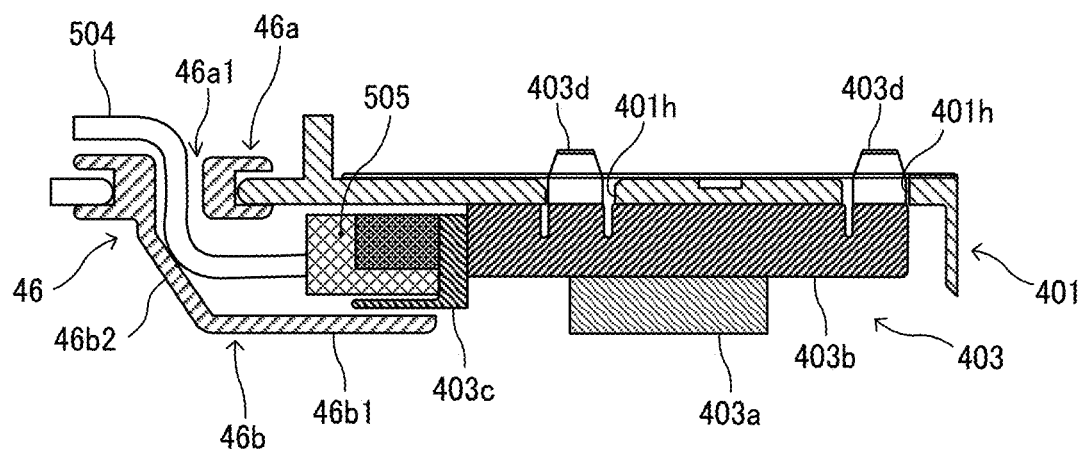
FIG. 23 is a cross-sectional view of the sensor holder taken along line Q-Q in FIG. 22.

FIG. 21 is a perspective view of the vicinity of the sensor holder 401 to which the harness holding member 46 is attached. FIG. 22 is a front view of the sensor holder 401 to which the harness holding member 46 is attached as viewed from the rear side. FIG. 23 is a cross-sectional view of the vicinity of the sensor holder 401 taken along line Q-Q in FIG. 22.

As illustrated in FIGS. 21 to 23, the harness cover portion 46b1 and the wire guide portion 46b2 cover, from a lateral side, the electric wires 504 positioned on the rear side with respect to the connector 505 of the harness 500 and the sensor holder 401, and cover, without any gap, a lateral side of a portion of the harness 500 on the rear side with respect to the sensor holder 401.

As illustrated in FIG. 21, the cover part 46b of the harness holding member 46 includes an upper cover portion 46b4 and covers the electric wires 504 from above. In addition, the cover part 46b of the harness holding member 46 includes an overlap portion 46b3 that is one step lower than the upper cover portion 46b4. The distal end side of the overlap portion 46b3 is inserted under the upper sensor cover portion 401a. Accordingly, the upper side of the portion of the harness 500 on the rear side with respect to the sensor holder 401 is covered with the upper cover portion 46b4, the overlap portion 46b3, and the upper sensor cover portion 401a without any gap. The lower side of the portion of the harness 500 on the rear side with respect to the sensor holder 401 is covered with the lower sensor cover portion 401d without any gap.

The connector 505 is covered with the sensor holder 401 with respect to the vertical direction (in other words, up-down direction) and the front side and is covered with the harness holding member 46 with respect to the rear side. Accordingly, the connector 505 is covered on all sides with the sensor holder 401 and the harness holding member 46. Such a configuration can prevent access to the connector 505 from any of the four directions.

Since the electric wires 504 positioned on the rear side with respect to the sensor holder 401 are also covered with the harness holding member 46, such a configuration can also prevent access to the electric wires 504 positioned on the rear side with respect to the sensor holder 401.

Thus, when the user accesses the cover handle 106d to open and close the upper fixing cover 106c, the user's finger or the like can be prevented from touching the electric wires 504 and the connector 505 of the harness 500. Accordingly, the above-described configuration can prevent the user's finger from being caught by the electric wires 504 and prevent the electric wires 504 from being detached from the connector 505, thus preventing the harness 500 from being damaged. Disconnection due to disconnection of the connector 505 from the opening-closing sensor 403 can be prevented. Further, the above-described configuration can prevent the occurrence of a connection failure due to a semi-connected state and the occurrence of erroneous detection of the opening-closing sensor 403.

In addition, the connector 505 covered with the sensor holder 401 and the harness holding member 46 can prevent static electricity from being discharged toward the wire insertion holes 505a of the connector 505 and prevent electrostatic breakdown of the opening-closing sensor 403.

Further, the number of components can be reduced and the cost of the apparatus can be reduced as compared with a case in which a cover member covering the electric wires 504 and the connector 505 of the harness 500 is provided separately from members holding the electric wires 504 of the harness 500 (in the present embodiment, the sensor holder 401 as the first member and the harness holding member 46 as the second member). Further, holding of the electric wires 504 of the harness 500 and covering of the portion of the harness 500 on the rear side with respect to the sensor holder 401 can be performed only by the work of assembling the harness holding member 46 to the sensor holder 401. Such a configuration can reduce the number of assembling steps as compared with the case in which a cover member covering the electric wires 504 and the connector 505 of the harness 500 is provided.

In the case in which the harness holding member 46 does not have the overlap portion 46b3 overlapping the upper sensor cover portion 401a, a gap is formed between the upper sensor cover portion 401a and the cover part 46b of the harness holding member 46. Accordingly, a tool such as a screwdriver might approach the connector 505 through the gap, and electrostatic discharge might occur from the tool toward the wire insertion holes 505a of the connector 505, thus causing electrostatic breakdown of the opening-closing sensor 403.

However, in the present embodiment, since the overlap portion 46b3 is provided, such a tool does not approach the connector 505 from between the upper sensor cover portion 401a and the cover part 46b. Accordingly, electrostatic discharge to the wire insertion holes 505a of the connector 505 can be further reliably prevented, and electrostatic breakdown of the opening-closing sensor 403 can be further restrained.

In the present embodiment, the overlap portion 46b3 of the harness holding member 46 is overlapped from below the upper sensor cover portion 401a. However, in some embodiments, an end portion of the upper sensor cover portion 401a on the attachment groove 401b side may be lowered by one step, and the overlap portion 46b3 of the harness holding member 46 may be overlapped from above the upper sensor cover portion 401a.

As illustrated in FIG. 23, in the opening-closing sensor 403, two pairs of attachment claw portions 403d and are provided at a predetermined interval in the left-right direction. The attachment claw portions 403d of each pair are provided at a predetermined interval in the vertical direction. The sensor holder 401 includes two sensor attachment holes 401h that are long in the vertical direction. The two sensor attachment holes 401h are provided at a predetermined interval in the horizontal direction. Each pair of attachment claw portions 403d are inserted through the sensor attachment holes 401h. The distal ends of the upper attachment claw portions 403d are hooked to the upper ends of the sensor attachment holes 401h. The distal ends of the lower attachment claw portions 403d are hooked to the lower ends of the sensor attachment holes 401h. Thus, the opening-closing sensor 403 is attached to the sensor holder 401.

Facing portions 407b of the grounding plate 407 serving as a grounding member described below penetrate through holes 401g illustrated in FIG. 22. An upper conveyance cover portion 100c illustrated in FIG. 21 covers a space between the front cover 100a (see FIG. 7) and the front side plate 107a. The upper conveyance cover portion 100c is provided on the front cover 100a. An outer edge portion 100d extending downward is not provided at a portion of the upper conveyance cover portion 100c facing the upper sensor cover portion 401a. A front portion of the upper sensor cover portion 401a enters below the upper conveyance cover portion 100c. The upper side of the harness holding member 46 faces the outer edge portion 100d of the upper conveyance cover portion 100c.

In the configuration illustrated in FIG. 21, a predetermined clearance is provided between the harness holding member 46 and the outer edge portion 100d of the upper conveyance cover portion 100c. In the present embodiment, as illustrated in FIG. 6 and the like, a mechanism (e.g., the air blowing fan 124 and the air suction duct 128) that supplies air to the upper air duct 115 and the lower air duct 116 is provided between the front cover 100a (see FIG. 7) and the front side plate 107a. If there is a predetermined clearance between the harness holding member 46 and the outer edge portion 100d of the upper conveyance cover portion 100c, an air flow may leak from the clearance or air may enter the clearance. Accordingly, an unintended pressure loss may occur, and an intended amount of air might not be sent to the upper air duct 115 and the lower air duct 116.

Figure 24:
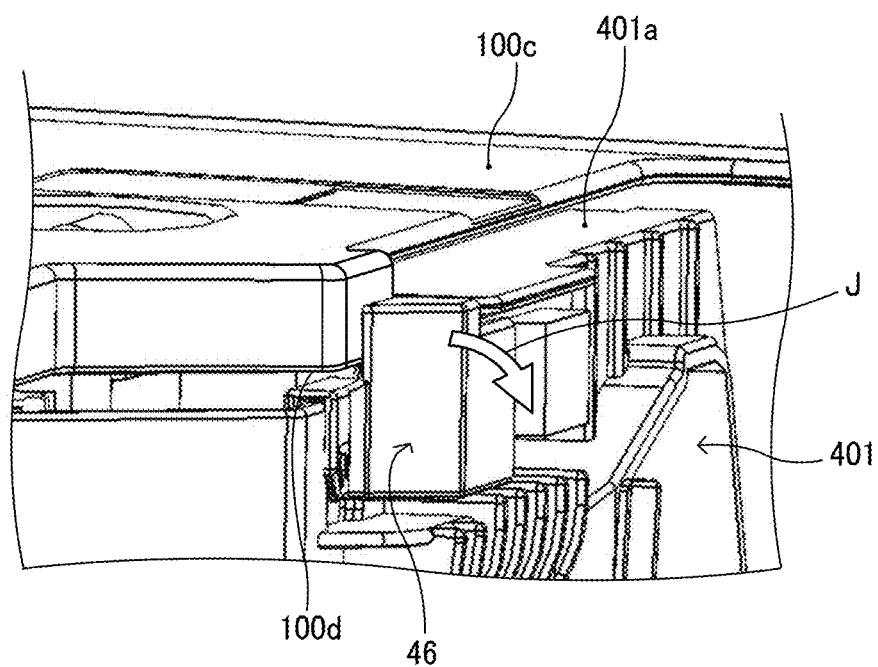
FIG. 24 is a perspective view illustrating an example of a configuration in which there is almost no gap between the harness holding member and an outer edge portion of an exterior cover portion.

Hence, for example, as illustrated in FIG. 24, it is preferable that there is almost no clearance between the harness holding member 46 and the outer edge portion 100d of the upper conveyance cover portion 100c. However, when the position of the outer edge portion 100d of the upper conveyance cover portion 100c is shifted to the rear side from the target position due to dimensional tolerance or the like, the outer edge portion 100d of the upper conveyance cover portion 100c might push the harness holding member 46 to the rear side. Therefore, the harness holding member 46 is preferably configured to be elastically deformable in a direction indicated by arrow J in FIG. 24. Accordingly, when the harness holding member 46 is pressed rearward by the outer edge portion 100d of the upper conveyance cover portion 100c, the harness holding member 46 is elastically deformed in the direction indicated by arrow J in FIG. 24. Thus, the portion of the harness holding member 46 facing the outer edge portion 100d can move rearward and escape. Such a configuration can prevent the harness holding member 46 from being damaged.

In addition, embodiments of the present disclosure are not limited to the above-described configuration. For example, a configuration may be adopted in which the distance between the pair of holding portions 46a3 illustrated in FIG. 13 is longer than the thickness of the edge of the attachment groove 401b, and the harness holding member 46 is attached to the attachment groove 401b so as to be movable in the front-rear direction within a predetermined range. With such a configuration as well, if the position of the outer edge portion 100d of the upper conveyance cover portion 100c is shifted to the rear side from the target position and the outer edge portion 100d of the upper conveyance cover portion 100c pushes the harness holding member 46 to the rear side, the harness holding member 46 can slide to the rear side, thus preventing damage to the harness holding member 46.

Further, in FIG. 24, the portion of the upper conveyance cover portion 100c facing the harness holding member 46 is protruded rearward to narrow the clearance between the harness holding member 46 and the outer edge portion 100d of the upper conveyance cover portion 100c. However, in some embodiment, the harness holding member 46 may be extended forward to narrow the clearance between the harness holding member 46 and the outer edge portion 100d of the upper conveyance cover portion 100c.

Alternatively, a configuration may be adopted in which the outer edge portion 100d of the portion of the upper conveyance cover portion 100c facing the harness holding member 46 is eliminated and the rear side portion of the upper conveyance cover portion 100c overlaps the front side portion of the harness holding member 46 from above, to narrow the clearance between the harness holding member 46 and the upper conveyance cover portion 100c. With such a configuration, even if the position of the outer edge portion 100d of the upper conveyance cover portion 100c is shifted to the rear side from the target position, the upper conveyance cover portion 100c does not push the harness holding member 46.

Next, the grounding plate 407 illustrated in FIG. 6 is further described.

As described above, the opening-closing sensor 403 is an optical sensor and detects the reflection light from the cover handle 106d to detect opening and closing of the upper fixing cover 106c. Therefore, the opening-closing sensor 403 is not covered with a cover member. Accordingly, when the user accesses the cover handle 106d, a finger of the user may approach the opening-closing sensor 403 and discharge static electricity toward the opening-closing sensor 403, which might cause electrostatic breakdown of the opening-closing sensor 403.

Figure 25A:
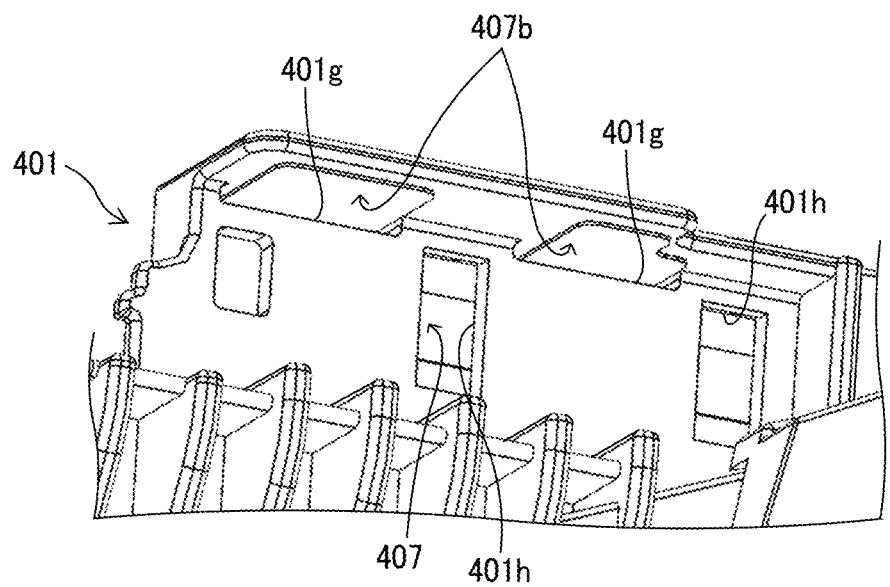
FIG. 25A is a perspective view illustrating a grounding plate and a sensor holder.
Figure 25B:
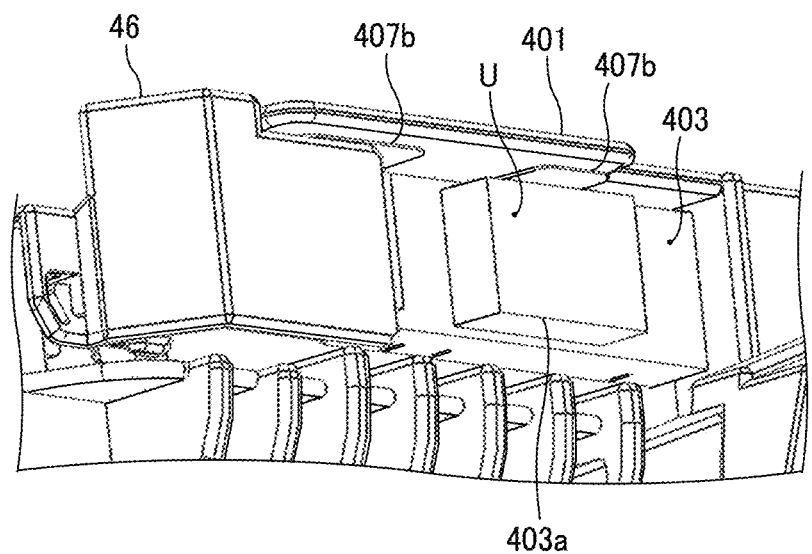
FIG. 25B is a perspective view illustrating the grounding plate, the sensor holder, an opening-and-closing sensor, and the harness holding member.

In order to prevent such discharge of static electricity to the opening-closing sensor 403, the grounding plate 407 is provided. FIG. 25A is a perspective view illustrating the grounding plate 407 and the sensor holder 401. FIG. 25B is a perspective view illustrating the grounding plate 407, the sensor holder 401, the opening-closing sensor 403, and the harness holding member 46. The grounding plate 407 serving as a grounding member includes the two facing portions 407b. The facing portions 407b penetrate through the through holes 401g provided in the sensor holder 401 and face the opening-closing sensor 403 from above. As illustrated in FIG. 25B, the distal end of the facing portion 407b is located at the same position as a detection surface U of the sensor portion 403a of the opening-closing sensor 403 in the front-rear direction.

Typically, a user accesses the cover handle 106d from above. Accordingly, when the user accesses the cover handle 106d, a finger of the user approaches the facing portions 407b of the grounding plate 407 disposed above the opening-closing sensor 403 before the opening-closing sensor 403. As a result, static electricity is discharged from the finger to the facing portions 407b of the grounding plate 407. Accordingly, after the static electricity is removed by the grounding plate 407, the finger approaches the opening-closing sensor 403. Thus, discharge of static electricity from the finger to the opening-closing sensor 403 is restrained, and electrostatic breakdown of the opening-closing sensor 403 is restrained.

Further, more preferably, the distal ends of the facing portions 407b are positioned rearward with respect to the detection surface U of the sensor portion 403a of the opening-closing sensor 403 in the front-rear direction. With such a configuration, even when the user's finger approaches the opening-closing sensor 403 in the front-rear direction, the finger approaches the facing portions 407b of the grounding plate 407 before the finger approaches the opening-closing sensor 403. Accordingly, the finger approaches the opening-closing sensor 403 after static electricity is discharged to the facing portions 407b. Thus, even when the finger approaches the opening-closing sensor 403 in the front-rear direction, discharge of static electricity to the opening-closing sensor 403 can be restrained, and electrostatic breakdown of the opening-closing sensor 403 can be further restrained.

If a through hole through which the facing portions 407b of the grounding plate 407 penetrate is also provided above the sensor attachment holes 401h, the rigidity of the sensor holder 401 is weakened. Hence, in the present embodiment, the through holes 401g are provided at positions different from the sensor attachment holes 401h in the left-right direction to divide the facing portions 407b into a plurality of portions. However, if the rigidity of the sensor holder 401 can be sufficiently ensured, it is preferable that a single facing portion 407b faces the entire opening-closing sensor 403.

The configurations according to the above-descried embodiments are limited examples and embodiments of the present disclosure are not limited to the above-described examples. For example, the present disclosure may include the following aspects and achieve the following effects.

Aspect 1

A wiring holder includes a first member such as the sensor holder 401 and a second member such as the harness holding member 46 attached to the first member and holds an electric wire such as the electric wire 504 by the first member and the second member. The wiring holder includes a connector cover part (corresponding to the harness cover portion 46b1 of the harness holding member 46 and the upper sensor cover portion 401a and the lower sensor cover portion 401d of the sensor holder 401 in the present embodiment) covering a connector such as the connector 505 provided at one end of the electric wire such as the electric wire 504. The connector cover part is provided on at least one of the first member and the second member. According to such a configuration, the connector such as the connector 505 is covered with the connector cover part provided on at least one of the first member and the second member. Thus, static electricity can be prevented from being discharged from a finger or the like toward the connector. Accordingly, such a configuration can restrain electrostatic breakdown of an electric component such as the opening-closing sensor 403 to which the connector 505 is connected.

Aspect 2

In Aspect 1, the connector cover part and another connector cover part, respectively, are provided on the first member such as the sensor holder 401 and the second member such as the harness holding member 46. The connector cover part and the other connector cover part cover four sides (or all sides) of the connector such as the connector 505. As described in the above-described embodiment, such a configuration can prevent, e.g., a user's finger from approaching the connector such as the connector 505 from any of four directions and further restrain discharge of static electricity from the finger or the like toward the connector.

Aspect 3

In Aspect 1 or 2, at least one of the first member such as the sensor holder 401 and the second member such as the harness holding member 46 includes a wire cover part (including the cover part 46b of the harness holding member 46 and the lower sensor cover portion 401d of the sensor holder 401 in the present embodiment). The wire cover part covers the electric wire such as the electric wire 504 from the connector such as the connector 505 to a wire holding part formed of the first member and the second member (corresponding to the convex-shaped space formed by the wire holding groove 46a1 and the clearance S between the bottom portion of the attachment groove 401b of the sensor holder 401 and the lower portion of the attachment part 46b of the harness holding member 46 in the present embodiment). As described in the above-described embodiment, such a configuration can prevent a finger or the like from being caught by the electric wire such as the electric wire 504. Accordingly, a harness such as the harness 500 can be prevented from being damaged by an external force applied to the harness 500. Such a configuration can also prevent a connection portion between the connector such as the connector 505 and an electrical component such as the opening-closing sensor 403 from being disconnected or being in a semi-connected state.

Aspect 4

In any one of Aspects 1 to 3, the first member such as the sensor holder 401 includes an attachment groove portion such as the attachment groove 401b to which the second member such as the harness holding member 46 is attached. Projecting portions such as the locking projections 401c are formed on both side surfaces of the attachment groove portion. The second member is elastically deformable, includes claw portions such as the locking claw portions 46a2 to be hooked on the projecting portions to hold the second member to the first member, and includes an attachment part 46a attached to the attachment groove portion. According to the configuration, the claw portions such as the locking claw portions 46a are engaged with the projecting portions such as the locking projections 401c, thus allowing the attachment part 46a to be attached to the attachment groove portion such as the attachment groove 401b.

Aspect 5

In Aspect 4, there is a clearance such as the clearance S between the attachment part such as the attachment part 46a and a bottom surface of the attachment groove portion such as the attachment groove 401b. As described with reference to FIG. 20, such a configuration can prevent the electric wire such as the electric wire 504 from being sandwiched between the attachment part such as the attachment part 46a and the bottom surface of the attachment groove portion. Thus, the occurrence of disconnection of the electric wire such as the electric wire 504 can be restrained.

Aspect 6

In Aspect 4 or 5, an opening edge portion such as the upper end portion 401f of the attachment groove portion such as the attachment groove 401b is rounded. According to the configuration, as described in the above-described embodiment, the attachment part such as the attachment part 46a of the second member such as the harness holding member 46 can be guided to the attachment groove portion such as the attachment groove 401b by the round-shaped opening edge portion. Thus, the attachment part such as the attachment part 46a can be easily attached to the attachment groove portion.

Aspect 7

In any one of Aspects 1 to 6, the second member such as the harness holding member 46 has a guide portion such as the wire guide portion 46b2 to guide the electric wire such as the electric wire 504 to a wire holding portion formed by the first member and the second member (in the present embodiment, the convex space formed by the wire holding groove 46a1 and the clearance S between the bottom portion of the attachment groove 401b of the sensor holder 401 and the lower portion of the attachment part 46a of the harness holding member 46). Such a configuration allows the electric wire such as the electric wire 504 extending from the connector such as the connector 505 to be smoothly routed to the wire holding portion.

Aspect 8

In Aspect 7, the guide portion such as the wire guide portion 46b2 is an inclined surface that approaches the wire holding portion (in the present embodiment, the convex space formed by the wire holding groove 46a1 and the clearance S between the bottom portion of the attachment groove 401b of the sensor holder 401 and the lower portion of the attachment part 46a of the harness holding member 46) as the distance from the connector such as the connector 505 increases. Such a configuration allows the electric wire such as the electric wire 504 extending from the connector such as the connector 505 to be smoothly routed to the wire holding portion.

Aspect 9

In Aspect 7 or 8, the guide portion such as the wire guide portion 46b2 is connected to the attachment part such as the attachment part 46a of the second member such as the harness holding member 46 attached to the first member such as the sensor holder 401. According to the configuration, as described in the above-described embodiment, the rigidity of the attachment part such as the attachment part 46a can be increased. Such a configuration can prevent the second member from being detached from the first member due to elastic deformation when an external force is applied to the attachment part 46a.

Aspect 10

In any one of Aspects 1 to 9, the connector cover part and another connector cover part, respectively, are provided on the first member such as the sensor holder 401 and the second member such as the harness holding member 46. The second member includes an overlap portion such as the overlap portion 46b3 that overlaps the connector cover part (in the present embodiment, the upper sensor cover portion 401a) of the first member. Such a configuration can prevent a gap from being generated between the connector cover part of the first member and the other connector cover part of the second member. Accordingly, the configuration can prevent a member such as a tool from approaching from a gap between the connector cover part of the first member and the other connector cover part of the second member and further restrain generation of discharge of static electricity to the connector such as the connector 505.

Aspect 11

In any one of Aspects 1 to 10, at least a facing portion of the second member such as the harness holding member 46 that faces an opposed member (in the present embodiment, the upper conveyance cover portion 100c) facing the second member is movable within a predetermined range in a facing direction in which the facing portion faces the opposed member. According to the configuration, as described with reference to FIG. 24, when the position of the opposed member such as the upper conveyance cover portion 100c is shifted to the second member side with respect to the target position due to the dimensional tolerance and the opposed member presses the second member, at least the facing portion of the second member facing the opposed member can move in the facing direction and escape. Such a configuration can prevent damage to the second member such as the harness holding member 46.

Aspect 12

In any one of aspects 1 to 11, the first member such as the sensor holder 401 is a component holding member that holds an electrical component such as the opening-closing sensor 403 to which the connector such as the connector 505 is connected. The component holding member includes a facing portion such as the facing portion 407b facing the electrical component and is attached with a grounding member such as the grounding plate 407 that is electrically grounded. According to the configuration, as described in the above-described embodiment, before a finger or the like approaches the electrical component, static electricity can be discharged from the finger toward the facing portion such as the facing portion 407b of the grounding member such as the grounding plate 407. Thus, such a configuration can restrain discharge of static electricity to an electric component and restrain electrostatic breakdown of the electric component.

Aspect 13

In any one of aspects 1 to 12, the first member such as the sensor holder 401 is a component holding member that holds an electrical component such as the opening-closing sensor 403 to which the connector such as the connector 505 is connected. The component holding member includes a component cover portion (corresponding to the upper sensor cover portion 401a and the lower sensor cover portion 401d in the present embodiment) that covers the electrical component. As described in the above-described embodiment, such a configuration can prevent a device such as the fixing device 106 from colliding with the electrical component such as the opening-closing sensor 403 and restrain the electrical component from being damaged.

Aspect 14

An image forming apparatus includes an electric component such as the opening-closing sensor 403, an electric wire such as the electric wire 504, a connector such as the connector 505 disposed at one end of the electric wire and connected to the electric component, and the wiring holder according to any one of Aspects 1 to 13 to hold the electric wire such as the electric wire 504. Such a configuration can restrain electrostatic breakdown of the electrical component.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

The invention claimed is:

1. A wiring holder, comprising:
a first member; and
a second member attached to the first member,
the first member and the second member being configured to hold an electric wire,
at least one of the first member and the second member including a connector cover portion configured to cover a connector at one end of the electric wire,
wherein the first member includes an attachment groove portion to which the second member is attached,
wherein opposed side surfaces of the attachment groove portion include projecting portions, and
wherein the second member is elastically deformable, includes claw portions to be hooked on the projecting portions to hold the second member to the first member, and includes an attachment part attached to the attachment groove portion.

2. The wiring holder according to claim 1,
wherein the first member and the second member include the connector cover portion and another connector cover portion, respectively, configured to cover four sides of the connector.

3. The wiring holder according to claim 1,
wherein the first member and the second member constitute a wiring holding portion configured to hold the electric wire, and
wherein at least one of the first member and the second member includes a wire cover part configured to cover the electric wire from the connector to the wiring holding portion.

4. The wiring holder according to claim 1,
wherein a clearance is between the attachment part and a bottom surface of the attachment groove portion.

5. The wiring holder according to claim 1,
wherein an opening edge portion of the attachment groove portion has a round shape.

6. The wiring holder according to claim 1,
wherein the first member and the second member constitute a wiring holding portion configured to hold the electric wire, and
wherein the second member includes a guide portion configured to guide the electric wire to the wiring holding portion.

7. The wiring holder according to claim 6,
wherein the guide portion is an inclined surface that approaches the wiring holding portion as a distance from the connector increases.

8. The wiring holder according to claim 6,
wherein the guide portion is connected to an attachment part of the second member attached to the first member.

9. The wiring holder according to claim 1,
wherein the first member is a component holding member configured to hold an electrical component to which the connector is connected, and
wherein the component holding member includes a facing portion facing the electrical component and is attached with a grounding member that is electrically grounded.

10. The wiring holder according to claim 1,
wherein the first member is a component holding member configured to hold an electrical component to which the connector is connected, and
wherein the component holding member includes a component cover portion configured to cover the electrical component.

11. An image forming apparatus, comprising:
an electric component;
an electric wire;
a connector disposed at one end of the electric wire and connected to the electric component; and
the wiring holder according to claim 1 configured to hold the electric wire.

12. A wiring holder, comprising:
a first member; and
a second member attached to the first member,
the first member and the second member being configured to hold an electric wire,
at least one of the first member and the second member including a connector cover portion configured to cover a connector at one end of the electric wire,
wherein the first member and the second member include the connector cover part and another connector cover part, respectively, and the second member includes an overlap portion configured to overlap the connector cover part of the first member.

13. A wiring holder, comprising:
a first member; and
a second member attached to the first member,
the first member and the second member being configured to hold an electric wire,
at least one of the first member and the second member including a connector cover portion configured to cover a connector at one end of the electric wire
wherein the second member includes a facing portion configured to face an opposed member facing the second member, and at least the facing portion is movable within a predetermined range in a facing direction in which the facing portion faces the opposed member.

\* \* \* \* \*